(12) United States Patent
Wigren et al.

(10) Patent No.: US 12,474,434 B2
(45) Date of Patent: Nov. 18, 2025

(54) METHODS AND APPARATUS FOR POSITIONING OF A MOVING UNMANNED AERIAL VEHICLE

(71) Applicant: Telefonaktiebolaget LM Ericsson (publ), Stockholm (SE)

(72) Inventors: Torbjörn Wigren, Uppsala (SE); Sholeh Yasini, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 402 days.

(21) Appl. No.: 18/015,354

(22) PCT Filed: Jul. 10, 2020

(86) PCT No.: PCT/SE2020/050726
§ 371 (c)(1),
(2) Date: Jan. 10, 2023

(87) PCT Pub. No.: WO2022/010393
PCT Pub. Date: Jan. 13, 2022

(65) Prior Publication Data
US 2023/0341505 A1    Oct. 26, 2023

(51) Int. Cl.
*G01S 5/02* (2010.01)
(52) U.S. Cl.
CPC .......... *G01S 5/0294* (2013.01); *G01S 5/0246* (2020.05); *G01S 5/0278* (2013.01); *G01S 2205/03* (2020.05)

(58) Field of Classification Search
None
See application file for complete search history.

(56) References Cited

U.S. PATENT DOCUMENTS

| 3,706,096 A | 12/1972 | Hammack |
| 2019/0323807 A1 | 10/2019 | Smith et al. |
| 2021/0282310 A1* | 9/2021 | Birkland ............... B60W 50/14 |

OTHER PUBLICATIONS

International Search Report and Written Opinion of the International Searching Authority for PCT International Application No. PCT/SE2020/050726 dated May 27, 2021.
Kalkan Yilmaz, "Doing More with Doppler: Frequency-Only Radars and Other Frequency-Based Systems with Applications", IEEE Microwave Magazine, vol. 17, No. 7, Jul. 1, 2016 (Jul. 1, 2016), pp. 26-52.

* cited by examiner

*Primary Examiner* — Whitney Moore
(74) *Attorney, Agent, or Firm* — Sage Patent Group

(57) ABSTRACT

A method of determining the position of a moving unmanned aerial vehicle (UAV) is provided. The method comprises obtaining, for each of three or more base stations, one or more measurements of a carrier frequency offset (CFO) for one or more signals sent between a moving UAV and the respective base station. The method further comprises inputting the CFO measurements into a model to determine a position of the UAV, in which inputs to the model do not include range measurements of the UAV with respect to the three or more base stations.

20 Claims, 14 Drawing Sheets

METHODS AND APPARATUS FOR POSITIONING OF A MOVING UNMANNED AERIAL VEHICLE

CROSS REFERENCE TO RELATED APPLICATION

This application is a 35 U.S.C. § 371 national stage application of PCT International Application No. PCT/SE2020/050726 filed on Jul. 10, 2020, the disclosure and content of which is incorporated by reference herein in its entirety.

TECHNICAL FIELD

Embodiments of the present disclosure relate to positioning, and particularly to methods and apparatus for determining a position of a vehicle comprising a wireless device.

BACKGROUND

Unmanned Aerial Vehicles (UAVs) are increasingly being used for a diverse range of applications. In the past, UAVs were required to stay within range of a dedicated radio controller equipment, drastically restricting their range. However, a UAV may now be provided with the capability to connect to base stations in a wireless communication network, which allows the UAV to travel over multiple cells in the network. When operated in this manner, the range of a UAV is effectively limited only by its battery.

Whilst this further diversifies the range of applications for which UAVs may be used, it may also create additional challenges. In particular, the increasing prevalence of UAVs may increase the risk of conflict between UAVs and other airspace users (e.g. planes). In addition, as a result of their elevation, UAVs are more likely to have an uninterrupted line-of-sight to base stations and wireless devices, which means that UAVs may generate increased interference for other devices in the network. Furthermore, UAVs operating at high altitudes may be served by sidelobes of base station antennas that are downtilted, which means that UAVs may be at risk of sudden signal changes.

In some jurisdictions, users are required to register UAVs configured to operate in this manner, which allows such UAVs to be regulated and monitored. In the absence of such registration, however, it can be difficult to track and monitor the movements of UAVs. Although various countermeasures exist for managing UAVs (e.g. restricting the movement of a UAV and/or mitigating additional interference caused by a UAV), many such countermeasures require knowledge of the position of the UAV.

SUMMARY

Embodiments of the present disclosure seek to address these and other problems.

In one aspect, a method of determining a position of a moving unmanned aerial vehicle (UAV) is provided. The method comprises obtaining, for each of three or more base stations, one or more measurements of a carrier frequency offset for one or more signals sent between the moving UAV and the respective base station. The method further comprises inputting the carrier frequency offset, CFO, measurements into a model to determine a position of the moving UAV, wherein inputs to the model do not include range measurements of the moving UAV with respect to the three or more base stations.

In a further aspect, the disclosure provides an apparatus to perform the method recited above. A further aspect provides a computer program for performing the method recited above. A computer program product, comprising the computer program, is also provided.

A still further aspect of the present disclosure provides an apparatus for determining the position of a moving UAV. The apparatus comprises a processor and a machine-readable medium, in which the machine-readable medium contains instructions executable by the processor such that the apparatus is operable to: obtain, for each of three or more base stations, one or more measurements of a carrier frequency offset for one or more signals sent between the moving UAV and the respective base station. The apparatus is further operable to input the carrier frequency offset, CFO, measurements into a model to determine a position of the moving UAV, wherein inputs to the model do not include range measurements of the moving UAV with respect to the three or more base stations.

Conventionally, positioning methods for UAVs require the use of range measurements such as, for example, round trip travel time measurements or radar measurements. In contrast, the present disclosure provides methods and apparatus for determining a moving UAV's position without requiring the use of any range measurements for the UAV.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
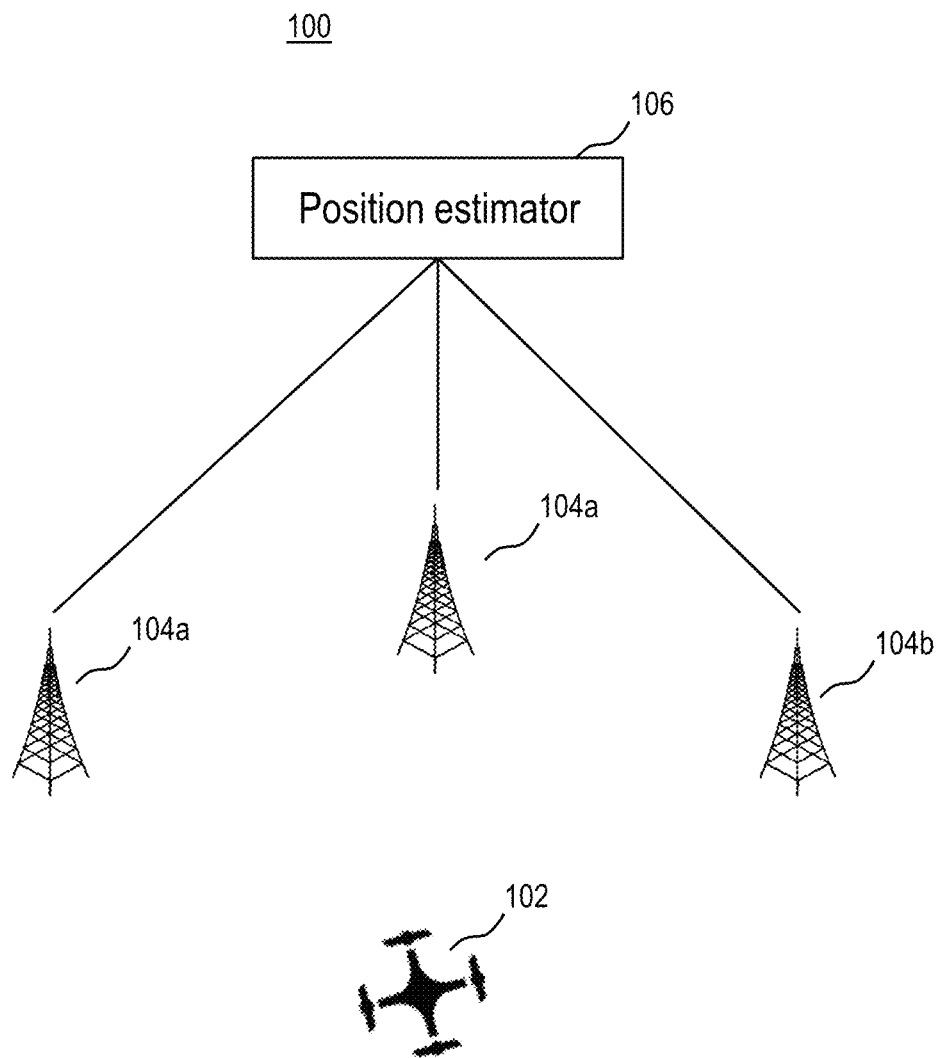
FIG. 1 shows a wireless communication network according to embodiments of the disclosure.

FIG. 1 shows a wireless communication network 100 according to embodiments of the disclosure. The wireless communication network 100 may implement any suitable wireless communications protocol or technology, such as Global System for Mobile communication (GSM), Wideband Code-Division Multiple Access (WCDMA), Long Term Evolution (LTE), New Radio (NR), WiFi, WiMAX, or Bluetooth wireless technologies. In one particular example, the network 100 forms part of a cellular telecommunication network, such as the type developed by the $3^{rd}$ Generation Partnership Project (3GPP). Those skilled in the art will appreciate that various components of the network 100 are omitted from FIG. 1 for the purposes of clarity.

The communications network 100 comprises a first base station 104a, a second base station 104b and a third base station 104c. The first base station 104a is in radio communication with an unmanned aerial vehicle (UAV) 102, which has an integrated wireless device (such as, for example, a user equipment, a mobile station etc.). The UAV 102 is connected to a core network via the base station 104a and a backhaul network (not illustrated). The first base station 104a may be, for example, the serving base station for the UAV 102. Although only three base stations 104a, 104b, 104c (collectively, 104) are shown, the skilled person will appreciate that the network 100 may in general contain three or more base stations 104.

Existing methods for determining a position of a UAV typically require using range related measurements such as, for example, time of arrival measurements. These techniques often require high accuracy time synchronisation, and may also necessitate additional signalling between the UAV and other nodes in the network. Some positioning techniques may also need to be tailored to specific base stations requiring, for example, cell-specific models to be trained.

Aspects of the disclosure address these and other problems by using carrier frequency offset measurements to determine a position of a UAV.

Due to the Doppler effect, any movement of a UAV towards or away from a base station changes the frequency of signals received at, for example, the base station from the UAV. A base station measuring the frequency of a signal transmitted from the UAV at a carrier frequency, $f_c$, would thus determine the Doppler frequency $f_D$ of the signal, the difference between the carrier frequency and the measured, received frequency, to be $$f_D = \frac{v_s}{c} f_c$$

in which $v_s$ is the (departing) velocity of the UAV with respect to the base station and c is the speed of light. The Doppler frequency may also be referred to as the carrier frequency offset, CFO.

According to embodiments of the present disclosure, measurements of a CFO between each of three or more base stations and a UAV are used to determine the position of a moving UAV. In particular, CFO measurements performed on signals sent between the UAV and three or more base stations are input to a model to determine the UAV's position.

The CFO measurements are used in the absence of any range measurements of the UAV with respect to the three or more base stations (e.g. any other measurements indicative of a distance between the UAV and the three or more base stations).

The present disclosure thus enables the position of a UAV to be determined in the absence of any range measurements such as, for example, round-trip travel time measurements or pathloss measurements. Further, according to the examples disclosed herein, CFO measurements may be used to determine a UAV's position without requiring the use of cell-specific models. In particular examples, CFO measurements may be performed on signals sent as part of legacy signalling procedures. Aspects of the present disclosure may thus enable a UAV to be tracked without requiring any additional signalling from the UAV.

The CFO measurements may additionally be used to determine a velocity (e.g. speed) of the UAV. Thus, for example, the model may output a kinematic state estimate for the UAV, in which the kinematic state comprises the position of the moving UAV and a velocity of the moving UAV. Those skilled in the art will appreciate that, in general, the velocity of a UAV may be a vector and thus may be indicative both of a speed of the UAV and its direction of movement.

The method may be performed iteratively such that, for example, the position (or kinematic state) of the moving UAV at a first time instance is itself determined (e.g. predicted) based on an estimate of the position of the moving UAV at a second, earlier time instance. The position of the UAV may thus be monitored over time, e.g., as it travels along a trajectory, at each of a plurality of time instances, by initially estimating the position of the UAV based on its previous position and then updating the initial estimate based on CFO measurements.

CFO measurements that are performed on signals transmitted between the UAV 102 and the three base stations 104 are input to a model to determine a position of the UAV 102. For example, each of the base stations 104 may perform CFO measurements on signals sent by the UAV 102. Alternatively, the UAV 102 may perform CFO measurements on signals sent by each of the base stations 104.

In particular examples, the CFO measurements may be the only measurements that are indicative of the UAV's position that are input to the model. However, quantities other than measurements may be input to the model. Thus, for example, the model may further take an estimate of an earlier position of the UAV as input. However, in the embodiments of the invention, the model may not take a measurement of a distance between the UAV and one of the base stations 104 (e.g. a range measurement) as input.

The method may be performed by one of the three or more base stations 104. In one example, the UAV 102 performs CFO measurements on signals received from the three or more base stations 104 and sends the CFO measurements to the first base station 104a. In another example, the first base station 104a may perform CFO measurements on signals sent by the UAV 102. The first base station 104a may also receive respective CFO measurements from each of the other base stations 104b, 104c (e.g. respective CFO measurements performed by the other base stations 104b, 104c). The first base station 104a may input the CFO measurements for all of the base stations 104 into the model.

In alternative embodiments, the method may be performed by another node in the network 100, such as those nodes that are in or connected to the core network in the communications network 100. In the illustrated example, the network 100 further comprises a position estimator 106, which may form part of the core network (e.g. the position estimator 106 is implemented in a core network node), or any other part of the network. The position estimator 106 may receive one or more respective CFO measurements for each of the three base stations 104 and inputs the CFO measurements into a model to determine the position of the UAV 102. The base stations 104 may perform the CFO measurements on signals sent by the UAV 102. The position estimator 106 may, for example, receive the CFO measurements directly from the base stations 104.

In alternative examples, the UAV 102 may perform the CFO measurements. In this case, the position estimator 106 may receive the CFO measurements from the UAV 102 via one of the three or more base stations 104 (e.g. via a serving base station for the UAV 102). In another example, one base station may collate CFO measurements performed by the three or more base stations 104 and send the collated CFO measurements to the positioning node 106.

Aspects of the present disclosure thus provide a method of determining a position of a UAV using CFO measurements.

Figure 2:
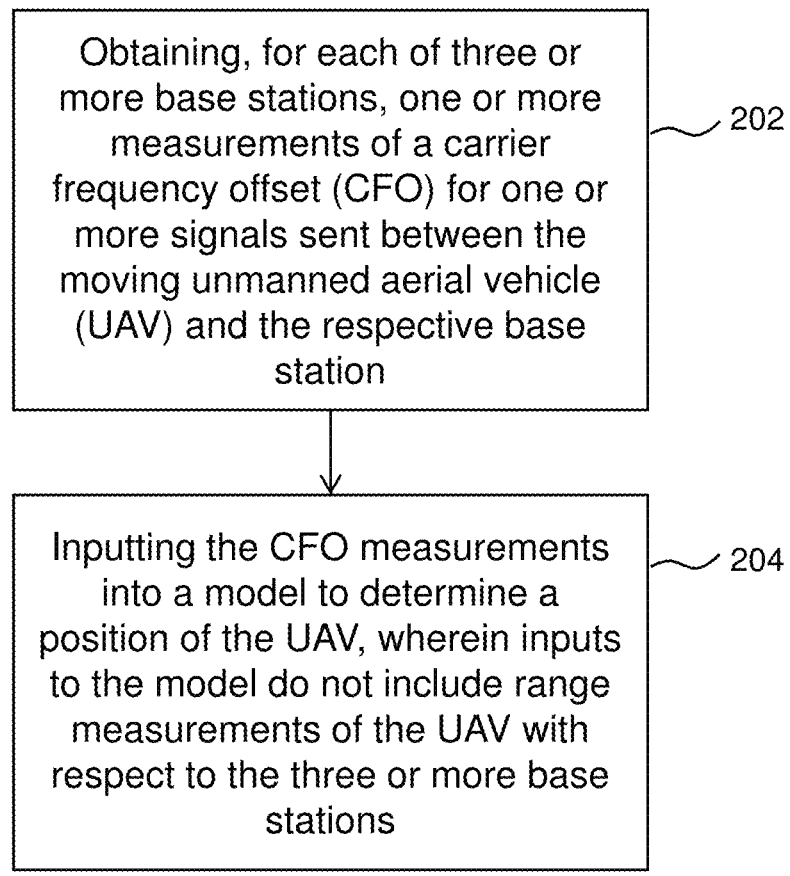
FIG. 2 is a flowchart of a method of determining a position of an unmanned aerial vehicle (UAV) according to embodiments of the disclosure.

FIG. 2 is a flowchart of a method 200 of determining a position of a moving UAV according to embodiments of the disclosure. The UAV may be, for example, the UAV 102 described above in respect of FIG. 1. The method 200 may be performed by one or more nodes in a wireless communications network (e.g. a communications network comprising the UAV 102). For example, the method 200 may be performed by a base station (e.g. one of the base stations 104 described above in respect of FIG. 1) or one or more nodes in a core network or connected to a core network (e.g. the position estimator 106 described above in respect of FIG. 1).

The method begins in step 202, in which, for each of three or more base stations 104, one or more measurements of a CFO for one or more signals sent between the moving UAV 102 and the respective base station are obtained. The three or more base stations may be the three or more base stations 104 described above in respect of FIG. 1, for example. The three or more base stations 104 may comprise, for example, any base station capable of sending a signal that can be received by the UAV 102 and/or any base station that is capable of receiving a signal from the UAV 102. That may include, for example, a base station that is capable of eavesdropping on a signal sent from the UAV 102 to another node (e.g. another base station).

In particular examples, the three or more base stations 104 may comprise a serving base station for the UAV 102 (e.g. the base station 104a) and two or more neighbouring base stations for the UAV 102 (e.g. the base stations 104b, 104c). Thus, for example, the two or more neighbouring base stations 104b, 104c may eavesdrop on a signal sent from the UAV 102 to its serving base station 104a to determine a CFO for the UAV 102. In alternative examples, more than one of the base stations 104 may serve the UAV 102, e.g., in a multi-connectivity configuration.

As described above, movement of a UAV towards or away from a base station changes the frequency of signals received at, for example, the UAV from the base station. A signal transmitted at a carrier frequency, $f_c$, may thus be received at a different frequency in which the difference (the Doppler frequency $f_D$) between the carrier frequency and the received frequency depends on a relative velocity of the receiver with respect to the transmitter. Therefore, a signal s(t) transmitted to a base station is received shifted as $e^{j2\pi\Delta ft}s(t)$ with frequency shift $\Delta f$. Correspondingly, the propagation channel h(t; τ), in which t is a time and τ is a delay, may be adapted according to $e^{j2\pi\Delta ft}h(t; \tau)$.

Signals sent between a moving UAV and a base station thus exhibit a frequency offset which is measurable at the receiver. The present disclosure provides methods in which measurements of this frequency offset, referred to as a carrier frequency offset (CFO), are used to determine a position of a moving UAV.

As noted above, the Doppler frequency may be referred to as the CFO. Thus, measurement of a CFO may refer to measurement of a shift or difference between a frequency of a signal as measured by its transmitter (e.g. the carrier frequency) and the frequency of the signal as measured by its receiver. Those skilled in the art will further appreciate that the frequency measured at the receiver by itself may be used for this purpose, particularly where the transmitted frequency is the same for signals received at each of the base stations 104. Accordingly, references to CFO or CFO measurements may be taken to refer to, for example, measurements of the received frequency or measurements indicative of a difference between the received frequency and the carrier frequency.

The CFO measurements may be, for example, performed by the UAV 102. In this case, step 202 may comprise receiving CFO measurements from the UAV 102. For example, the method may be performed by a serving base station for the UAV 102 and the serving base station may receive the CFO measurements performed by the UAV 102 on signals sent from the three or more base stations.

In other embodiments, the CFO measurements may be performed by the three or more base stations 104. In this case, the method may comprise receiving CFO measurements from each of the three or more base stations 104. For example, the method may be performed by a core network node (e.g. the positioning node 106) and the core network node may receive CFO measurements from each of the base stations 104. In another example, the method may be performed by one of the three or more base stations 104. In which case, one base station may receive CFO measurements from each of the other base stations and also perform CFO measurements on a signal received from the UAV 102.

The one or more signals used for determining CFO measurements may be transmitted to (e.g. intended for) a single cell such as, for example, a serving cell of the UAV. However, in particular embodiments, other base stations (e.g. such as base stations other than a serving base station) may eavesdrop on the signal and performed CFO measurements on the eavesdropped signal. Thus multiple base stations may perform a CFO measurement on a signal sent from a UAV.

The CFO measurements obtained in step 202 may be performed on any suitable signal sent between the UAV and the respective base station. In particular embodiments, one or more signals sent over an uplink channel such as a Physical Uplink Control CHannel (PUCCH) or a Physical Uplink Shared CHannel (PUSCH) may be used for determining a CFO. In embodiments in which the communications network 100 is an LTE network, one or more PUCCH signals may be used for measuring a CFO, for example. The skilled person will appreciate that there may be different advantages associated with measuring a CFO on a particular channel. For example, signals sent over the PUCCH may be sent without dynamic scheduling. In another example, measurements using PUSCH enable a received energy to be varied to obtain a minimum signal strength to obtain the phase $\varphi_i$ at a time $t_i$ to a minimum accuracy required to determine the CFO.

In particular examples, one or more reference signals (such as, for example, Sounding Reference Signals, SRSs) may be used for measuring a CFO. In embodiments in which the communications network 100 is an NR network, SRSs transmitted on the physical uplink shared channel (PUSCH) may be used to measure a CFO. For example, up to four adjacent symbols may be scheduled as SRSs, and the SRSs may be used to measure a CFO.

The CFO, Δf, of a channel may be determined using channel estimates for two different reference signals (e.g. reference signals transmitted on the PUSCH) with respective phases $\hat{\varphi}_1$, $\hat{\varphi}_2$:

$$\Delta f = \frac{\hat{\varphi}_2 - \hat{\varphi}_1}{(2\pi\Delta T)^2},$$

in which $\Delta T = t_2 - t_1$ is the time difference between the two channel estimates. The estimation accuracy depends on both the accuracy of $\hat{\varphi}_i$ and $\Delta T$:

$$\sigma_f^2 = \frac{2\sigma_\varphi^2}{(2\pi\Delta T)^2},$$

in which $\sigma_f^2$ and $\sigma_\varphi^2$ are the variances for the frequency shift estimate Lf and for the phase estimate $\hat{\varphi}$, respectively. The variance $\sigma_\varphi^2$ may decrease with increasing signal-to-noise ratio.

In particular examples, Fourier transformations that are done when Orthogonal Frequency Division Multiplexing (OFDM) reception is performed (e.g. in a 4G or a 5G cellular system) may be used to measure a CFO. The Fourier transform pair $$e^{iw_0 t} f(t) \leftrightarrow F(j(w-w_0))$$

may be exploited in the uplink to compare the phase shift between pilot signals (e.g. on two OFDM symbols) after each other.

Thus, CFO measurements may be performed by measuring one or more reference signals transmitted between the UAV and the three or more base stations.

As noted above, in particular embodiments, CFO measurements may be performed by each of the three or more base stations on one or more signals sent by the UAV. A UAV may be assigned a target power per resource block for signals sent to its serving cell. The power target may be set to a minimum signal-to-noise ratio in the desired receiver (e.g. at the serving base station) whilst minimising interference in neighbouring cells. Thus, the signal strength at which neighbouring base stations receive signals from the UAV may be too weak (e.g. to low) in order to obtain accurate CFO measurements. In some examples, signal strength may be improved by increasing a number of resource blocks that are scheduled for a particular channel. For example, the number of uplink resource blocks scheduled for PUSCH for a UAV may be increased. Since a total received signal power is proportional to the number of granted resource blocks, the power increases as a resource block allocation is increased, subject to any power limitation or constraints at the UAV.

Another approach for increasing the signal strength and thereby the accuracy of CFO measurements is to average CFO measurements performed on multiple signals. Accordingly, in particular embodiments, the CFO measurements for a base station in the three or more base stations may comprise an average of a plurality of CFO measurements performed on signals sent between the moving UAV and the respective base station. For example, a UAV may be granted uplink transmissions in multiple subframes. A base station receiving the uplink transmissions may perform CFO measurements on signals in each of the slots and average the results. In particular examples, the averaging may be performed using a one-tap Infinite Impulse Response (IIR) filter using $$\bar{f}_n = \alpha \hat{f}_n + (1-\alpha)\bar{f}_{n-1},$$

in which $\hat{f}_n$ and $\bar{f}_n$ are the $n^{th}$ sample of the unfiltered and filtered frequency shift estimates, respectively, and a is a constant, $0 < \alpha < 1$.

The method progresses to step 204, in which the position of the UAV 102 is determined by inputting the CFO measurements into a model.

As noted above, CFO measurements performed on signals sent between the UAV 102 and a respective base station 104 are sensitive to a relative velocity between the UAV 102 and the base station 104. The skilled person will appreciate that additional factors may also affect a CFO of a signal sent between a UAV 102 and a respective base station 104. For example, a frequency mismatch between a transmitter and a receiver may also cause an offset in a carrier frequency (e.g. inter-carrier interference). That is, an oscillator at the transmitter may oscillate at a different frequency to an oscillator in a receiver (e.g. the respective sampling clocks at the transmitter and the receiver may operate at different frequencies), which can cause a CFO. According to the present disclosure, other factors (e.g. factors other than the Doppler effect) that contribute to a carrier frequency effect are modelled as a bias in CFO measurements. This bias may be the same for each of the three or more base stations. In particular examples, this CFO bias may be estimated using the CFO measurements for the three or more base stations.

A CFO measurement, z, performed at a time $t_k$ on signals transmitted between a moving UAV and a base station depends on the relative speed of the moving UAV and the CFO bias according to:

$$z(t_k) = -\frac{f_c}{c} v_s(t_k) + x_7(t_k),$$

in which $v_s(t_k)$ is a relative speed of the moving UAV with respect to the base station (e.g. the speed of the UAV if the base station is stationary), c is the speed of light, $f_c$ is the carrier frequency and $x_7(t_k)$ is the CFO bias. In particular examples, the CFO bias may be assumed to be the same for each of the three or more base stations.

For a UAV at a position r with rate $\dot{r}$, and a (stationary) base station at position $r_s$, the relative velocity of the UAV with respect to the base station is given by $$v_S(\hat{x}) = \frac{(\hat{r} - r_s)}{\|\hat{r} - r_s\|} \cdot \dot{r}.$$

$$= \frac{(\hat{x}_1 - x_{s,1})\hat{x}_4 + (\hat{x}_2 - x_{s,2})\hat{x}_5 + (\hat{x}_3 - x_{s,3})\hat{x}_6}{\sqrt{(\hat{x}_1 - x_{s,1})^2 + (\hat{x}_2 - x_{s,2}) + (\hat{x}_3 - x_{s,3})}},$$

in which $x_{s,1}$, $x_{s,2}$, $x_{s,3}$ are the respective coordinates of the base station site, $\hat{x}_1$, $\hat{x}_2$, $\hat{x}_3$ are the coordinates of the UAV 102 and $\hat{x}_4$, $\hat{x}_5$, $\hat{x}_6$ are the components of the velocity of the UAV 102.

The CFO for signals transmitted between the UAV and a respective base station may thus be given by $$z(\hat{x}) = h(\hat{x}) = -\frac{f_c}{c} \frac{(\hat{x}_1 - x_{s,1})\hat{x}_4 + (\hat{x}_2 - x_{s,2})\hat{x}_5 + (\hat{x}_3 - x_{s,3})\hat{x}_6}{\sqrt{(\hat{x}_1 - x_{s,1})^2 + (\hat{x}_2 - x_{s,2}) + (\hat{x}_3 - x_{s,3})}} + x_7.$$

This relation may be referred to as the measurement equation. The measurement equation relates the observable, the CFO z, to the parameters to be determined (e.g. the position of the moving UAV 102 and preferably also the velocity of the moving UAV 102).

It is apparent from the measurement equation that a CFO measurement for signals transmitted between the moving UAV 102 and a respective base station is sensitive to both the velocity of the moving UAV 102 and the relative position of the UAV 102 with respect to the base station 104. CFO measurements may thus be used to determine at least the position of the moving UAV 102 and may additionally be used to determine the velocity of the UAV 102. In particular embodiments, the CFO bias may also be determined from the CFO measurements. Alternatively, the CFO bias may be, for example, be measured and compensated for by other means in the at least three or more base stations 104.

The skilled person will appreciate that the methods described herein apply only when the UAV 102 is moving. When the UAV 102 is stationary, the measurement equation reduces to $$z(\hat{x}) = x_7,$$

which means that any measurable CFO will not be indicative of a position of the UAV 102.

As stated above, step 204 comprises inputting the CFO measurements into a model to determine the position of the UAV 102. In particular examples, the position of the UAV 102 may be determined by inputting the CFO measurements into an extended Kalman filter. Thus, for example, the measurement equation provided above may be used to predict respective CFO measurements for each of the three or more base stations 104 based on an initial estimate of the position of the UAV 102. A difference between the CFO measurements obtained in step 202 and the predicted CFO measurements (e.g. a measurement residual) may be used to determine a position of the UAV 102 (e.g. to update the position estimate for the UAV 102).

In further examples, the UAV 102 is modelled as being in one of a plurality of movement modes, in which each of the plurality of movement modes is associated with a respective extended Kalman filter in a plurality of extended Kalman filters. The method may thus further comprise inputting the CFO measurements into the plurality of extended Kalman filters and combining one or more outputs of the plurality of extended Kalman filters to determine the position of the UAV 102 according to an interacting-multiple-model filtering process. This is described in more detail below in respect of FIG. 3.

As noted above, although the present disclosure is primarily concerned with determining the position of a moving UAV, the methods described herein may additionally be used to determine a velocity of the UAV. Embodiments described herein may be used to determine a kinematic state of a moving UAV, in which the kinematic state comprises at least the position of the UAV and a velocity of the UAV, and may also include an acceleration of the UAV. Thus, for example, the kinematic state of a UAV may consist of a three-dimensional position of the UAV and a three-dimensional velocity of the UAV, and also potentially a three-dimensional acceleration of the UAV.

As noted above, there are various methods for determining the kinematic state of a UAV.

In some exemplary methods, a UAV is modelled as having a plurality of possible movement modes. Thus, the UAV may, at a given instance in time, be in one of the plurality of movement modes. For example, a UAV may have a constant velocity mode (e.g. for movement along a straight line) and a manoeuvre mode (e.g. for turning). By taking into account the different movement modes of a UAV (e.g. the particular ways in which the UAV is capable of flying), more accurate kinematic state estimates for the UAV may be obtained.

One method for determining the kinematic state of a UAV with multiple movement modes is to determine a joint probability distribution of the kinematic state of the UAV. This kinematic state estimate may be propagated forward in time using the Fokker-Planck partial differential equation. Multi-dimensional integration may be used to obtain the posterior probability kinematic state distribution from the likelihood of the measurement and the prior probability distribution (e.g. a part of a Bayesian inference process). However, this can be computationally expensive, and may be particularly memory intensive. Whilst particle filtering may be used to approximate a Bayesian interference calculation, this approach is still demanding in terms of memory and computing resources.

An alternative, simpler approach for determining the kinematic state of a UAV involves modelling and estimating each mode separately, and then selecting a particular movement mode. For example, a UAV may be assumed to have two movement modes: a constant velocity mode (e.g. straight line movement) and a manoeuvre mode. The manoeuvre mode may be modelled by a leaky constant velocity movement that responds to measurements with higher agility than the constant velocity mode. A manoeuvre detector may be used to select a manoeuvre filter based on which filter provides a close match to any measurements. After a manoeuvre is terminated, a re-initialised constant velocity movement mode may be used for kinematic state estimation. Whilst this is a simple, robust approach, problems can arise when selecting threshold values for the manoeuvre detector.

An interactive-multiple-model (IMM) filter or process provides another alternative approach. When used to determine a kinematic state estimate for a UAV, the IMM process assumes that the UAV moves according to one of a finite number of modes. The modes may differ in their noise levels and/or structure. For example, modes may have different state dimensions and different unknown inputs. At a time, k, the state estimate may be computed (e.g. in parallel) under each possible mode using r filters. Each filter uses a different combination of previous mode-conditioned estimates (e.g. a different combination of state estimates from a previous cycle of the IMM process), which are referred to as mixed initial conditions.

Figure 3:
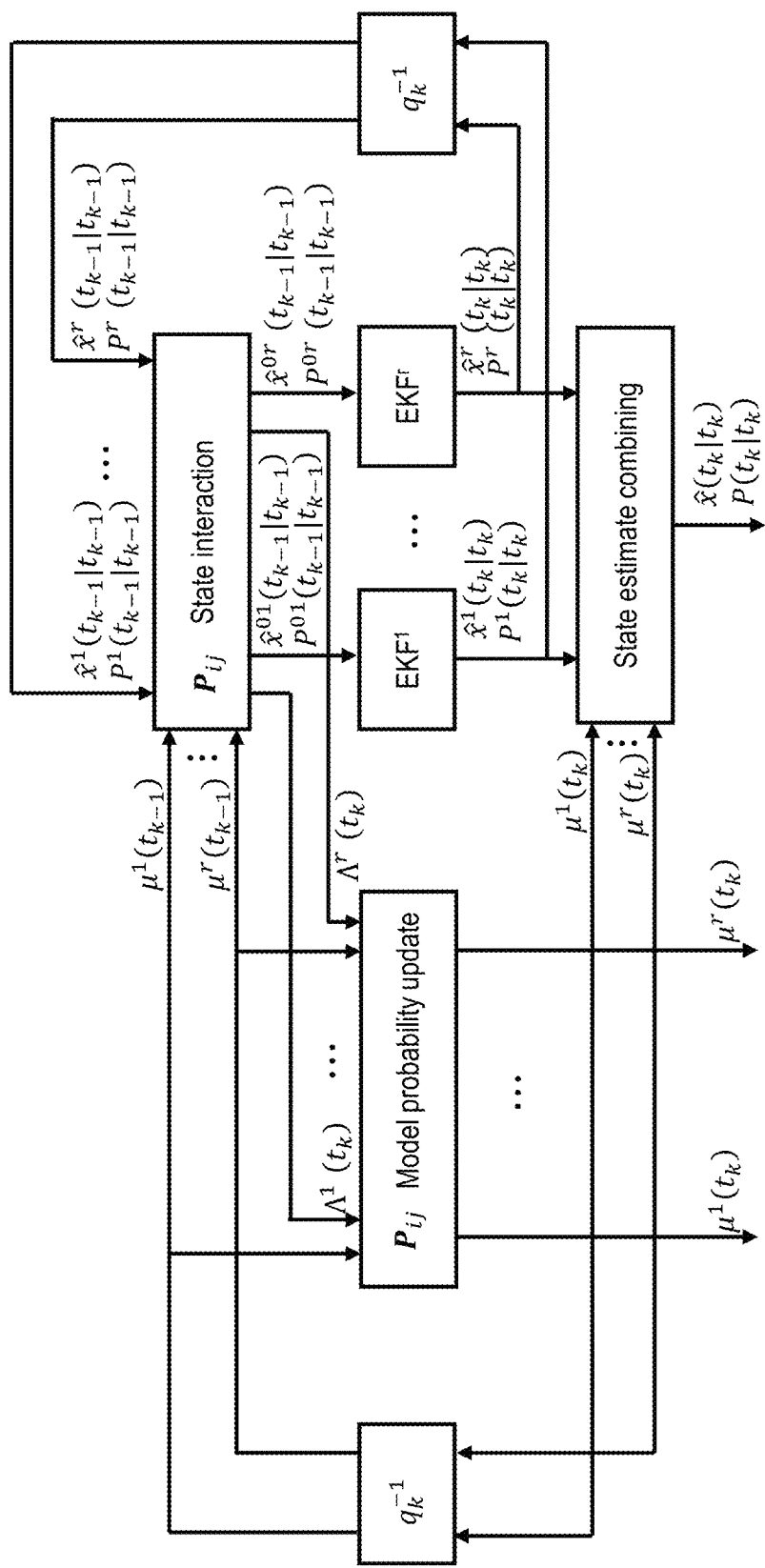
FIG. 3 is a schematic diagram of a cycle of an exemplary interacting-multiple-model filter process according to embodiments of the disclosure.

FIG. 3 is a schematic diagram of one cycle of an exemplary IMM process according to an embodiment of the present disclosure. The IMM process may be used, for example, to determine the position of the moving UAV as part of the method 200 described above in respect of FIG. 2, for example (e.g. as part of step 204). Thus, the IMM process may be used to determine the position of the UAV 102 described above in respect of FIG. 1, for example.

The IMM process comprises r interacting filters operating in parallel for $r \geq 2$. The state interaction/mixing unit determines mixed initial conditions, $\hat{x}^{01} \ldots \hat{x}^{0r}$, for each of the r filters from initial state estimates $\hat{x}^1 \ldots \hat{x}^r$ (e.g. initial position estimates) for the moving UAV 102. Mixing is performed at the input of the filters with the probabilities, and may be conditioned on earlier measurement data, $z^{k-1}$. The mixed initial conditions are, together with measurement data for a first time instance, $z^k$, input to the r filters.

The measurement data for the first time instance, $z^k$, comprises CFO measurements performed on signals transmitted between the UAV 102 and three or more base stations. The three or more base stations may be the base stations 104 described above in respect of FIG. 1, for example. The CFO measurements may be obtained, for example, as described above in respect of step 202 in the method 200 shown in FIG. 2.

One cycle of the IMM process may comprise the following steps:

1. State Interaction and State Mixing

The state and covariance matrices of a previous cycle (e.g. iteration) of the IMM process may be mixed to provide initial conditions to the mode matched filtering. This mixing is based on the mode transition probability matrix, $P_{ij}$, and the mode probabilities of a previous iteration (e.g. cycle) of the IMM process, $\mu_i(t_{k-1})$. The probability (e.g. the mixing probability) that mode $M_i$ was in effect at time $t_{k-1}$, given that mode $M_j$ is in effect at time $t_k$, given state estimation data $z^{k-1}$ is $$\mu_{i|j}(t_{k-1}|t_{k-1}) = \frac{1}{\bar{c}^j} p_{ij} \mu_i(t_{k-1}).$$

The normalising constants, $\bar{c}_j$, are given by the below equation, which uses mode transition probabilities $p_{ij}$. The mode transition probability, $p_{ij}$, is the probability that the UAV 102 is in a mode j at time k, given that the UAV 102 was in a mode i at a time $t_{k-1}$ (e.g. the probability of transition from mode i to mode j). The expression for the normalising constant is:

$$\bar{c}^j = \sum_{i=1}^{r} p_{ij} \mu_i(t_{k-1})$$

The mixed initial condition for the filter matched to mode $M_j(t_k)$ may be written as $$\hat{x}^{0j}(t_{k-1}|t_{k-1}) = \sum_{i=1}^{r} \mu_{i|j}(t_{k-1}|t_{k-1}) \hat{x}^i(t_{k-1}|t_{k-1}),$$

for j=1, ... r. $\hat{x}^i(t_{k-1}|t_{k-1})$ is the state estimate at time $t_{k-1}$ for mode i. The corresponding covariance is:

$$P^{0j}(t_{k-1}|t_{k-1}) = \sum_{i=1}^{r} \mu_{i|j}(t_{k-1}|t_{k-1})$$
$$\left( P^i(t_{k-1}|t_{k-1}) + \left(\hat{x}^i(t_{k-1}|t_{k-1}) - \hat{x}^{0j}(t_{k-1}|t_{k-1})\right)\left(\hat{x}^i(t_{k-1}|t_{k-1}) - \hat{x}^{0j}(t_{k-1}|t_{k-1})\right)^T \right),$$

in which $P^i(t_{k-1}|t_{k-1})$ is the state covariance matrix at time $t_{k-1}$ for mode i. The latter term appears when summing covariance matrices of a Gaussian mixture.

2. Mode Matched Filtering

For each mode, the respective initial conditions obtained in step 2 are used as input to a filter matched to the mode. An exemplary implementation of a filter, an extended Kalman filter, is described in more detail below.

3. Mode Probability Update

The probability of a particular mode at time $t_k$, $\mu^j(t_k)$, depends on a likelihood of the latest measurement $z(t_k)$ given the mode and the initial state and covariance matrices. The likelihood function, $\Lambda^j$, of a mode j (corresponding to a respective filter in the r filters) is:

$$\Lambda_j(t_k) = p[z(t_k)|M_j(t_k), z(t_{k-1})].$$

The respective likelihood function for each mode may thus be computed using the mixed initial condition and the associated covariance:

$$\Lambda^j(t_k) = p(z(t_k)|M_j, \hat{x}^{0j}(t_{k-1}|t_{k-1}), P^{0j}(t_{k-1}|t_{k-1})).$$

The probability of a mode j may be determined using:

$$\mu^j(t_k) = \frac{1}{c} \Lambda^j(t_k) \bar{c}^j,$$

in which $\bar{c}^j$ is given above and the normalisation factor c is:

4. State Estimate Combining $$c = \sum_{j=1}^{r} \Lambda_j(t_k) \bar{c}^j.$$

The mode probabilities may be used to combine the state estimates and covariance matrices for each of the modes to obtain a combined state estimate, $\hat{x}(t_k|t_k)$, and covariance matrix, $P(t_k|t_k)$:

$$\hat{x}(t_k|t_k) = \sum_{j=1}^{r} \mu^j(t_k) \hat{x}^j(t_k|t_k), \text{ and}$$

$$P(t_k|t_k) = \sum_{j=1}^{r} \mu^j(t_k) \left( P^j(t_k|t_k) + \left(\hat{x}^j(t_k|t_k) - \hat{x}(t_k|t_k)\right)\left(\hat{x}^j(t_k|t_k) - \hat{x}(t_k|t_k)\right)^T \right).$$

As described above, using IMM filtering to determine the kinematic state of a UAV assumes that the UAV moves according to one of a finite number of modes.

Embodiments of the present disclosure provide a two-mode model for a moving UAV. As described above, a CFO is only measurable when a UAV is moving, which means that CFO measurements may only be used to infer the position of a moving UAV. The UAV may thus be modelled as being in one of two movement modes comprising a first state model driven by a first Wiener process and a second state model driven by a second Wiener process. Each of the first and second state models may be six-dimensional models, in which three dimensions are used for position components and three dimensions are used for velocity components. In both modes the UAV may be assumed to be moving (e.g. non-stationary). Both modes are based upon constant velocity modes that are subject to an acceleration noise (represented by a Wiener process), and the second mode uses a larger acceleration noise than the first mode. The first mode may thus be an almost constant velocity model, whereas the second mode may be a manoeuvre mode with a larger acceleration. Both models may comprise an extra seventh state component (e.g. the models may be seven-dimensional models) to account for a CFO bias, which may be modelled as a random walk. As described above, the CFO bias captures other factors that contribute to a measured CFO such as, for example, an offset in the frequency of sampling clocks at the UAV and a respective base station.

The first state model (e.g. the first movement mode) is given by $$dx^1(t) = \begin{pmatrix} 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \end{pmatrix} x^1(t)dt + \begin{pmatrix} 0 & 0 & 0 & 0 \\ 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \end{pmatrix} w^1(t)dt$$

$$E\left[(w^1(t)dt)(w^1(s)ds)^T\right] = \begin{pmatrix} q_{11}^1 & 0 & 0 & 0 \\ 0 & q_{22}^1 & 0 & 0 \\ 0 & 0 & q_{33}^1 & 0 \\ 0 & 0 & 0 & q_{bias} \end{pmatrix} dt,$$

in which $x^1$ denotes the state vector, $w^1$ denotes the acceleration noise (e.g. the Wiener process system noise), $q_{11}$ is the variance of the acceleration noise in a first dimension, $q_{22}$ is the variance of the acceleration noise in a second dimension, $q_{33}$ is the variance of the acceleration noise in a third dimension, and $q_{bias}$ a is the variance of the CFO bias (e.g. the drift rate of the CFO bias).

The second state model (e.g. the second movement mode) is given by:

$$dx^2(t) = \begin{pmatrix} 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \end{pmatrix} x^2(t)dt + \begin{pmatrix} 0 & 0 & 0 & 0 \\ 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \end{pmatrix} w^2(t)dt$$

$$E\left[(w^2(t)dt)(w^2(s)ds)^T\right] = \begin{pmatrix} q_{11}^2 & 0 & 0 & 0 \\ 0 & q_{22}^2 & 0 & 0 \\ 0 & 0 & q_{33}^2 & 0 \\ 0 & 0 & 0 & q_{bias} \end{pmatrix} dt,$$

in which $x^2$ denotes the state vector and $w^2$ denotes the acceleration noise. As noted above, the second mode may have a larger acceleration noise than the first movement mode. Thus, in particular embodiments, $E|w^2|>E|w^1|$, in which E denotes mathematical expectation.

Any suitable filters may be used for the r filters in the IMM process, including, for example, one or more particle filters. In particular examples, a nonlinear extended Kalman Filter (EKF) may be used for each filter $M_j$ in the r filters in the IMM process. An extended Kalman Filter uses linear approximations of a nonlinear system. It can be used to estimate the kinematic state of a discrete-time dynamic system described by a vector difference equation with additive white Gaussian noise that models unpredictable disturbances.

In an extended Kalman filter, a mode is modelled as a linear state space differential equation and a non-linear measurement equation. The kinematic state of the UAV in a mode i at a time $t_{k+1}$ is given by $$x^i(t_{k+1}) = A^i(t_{k+1}, t_k)x^i(t_k) + w^i(t_k),$$

in which $A^i$ is a discrete time systems matrix and w is the system measurement noise. Thus, for example, for the first movement mode described above with a time varying sampling interval, $T_k = t_k - t_{k-1}$, the discrete time systems matrix is given by $$A^1(t_k, t_{k-1}) = \begin{pmatrix} 1 & 0 & 0 & T_k & 0 & 0 & 0 \\ 0 & 1 & 0 & 0 & T_k & 0 & 0 \\ 0 & 0 & 1 & 0 & 0 & T_k & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \end{pmatrix}$$

Similarly, for the second movement mode:

$$A^2(t_k, t_{k-1}) = \begin{pmatrix} 1 & 0 & 0 & T_k & 0 & 0 & 0 \\ 0 & 1 & 0 & 0 & T_k & 0 & 0 \\ 0 & 0 & 1 & 0 & 0 & T_k & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \end{pmatrix}$$

CFO measurements for the UAV 102 at a time $t_k$ are assumed to depend on the kinematic state of the UAV 102 according to:

$$\hat{z}^i(t_k) = h(\hat{x}^i(t_k)) + e(t_k),$$

in which h is the measurement equation, which is a nonlinear function of the kinematic state, and e is the measurement noise. The covariance matrix for the system noise is $$Q^i(t_{k+1}, t_k) = E[w^i(t_k)(w^i(t_k))^T]$$

for $l=1, \ldots, r$. Thus, for the first movement mode described above, the covariance matrix for the system noise may be written as $$Q^1(t_k, t_{k-1}) = \begin{pmatrix} 1/3\, q_{11}^1 T_k^3 & 0 & 0 & 1/2\, q_{11}^1 T_k^2 & 0 & 0 & 0 \\ 0 & 1/3\, q_{22}^1 T_k^3 & 0 & 0 & 1/2\, q_{22}^1 T_k^2 & 0 & 0 \\ 0 & 0 & 1/3\, q_{33}^1 T_k^3 & 0 & 0 & 1/2\, q_{33}^1 T_k^2 & 0 \\ 1/2\, q_{11}^1 T_k^2 & 0 & 0 & q_{11}^1 T_k & 0 & 0 & 0 \\ 0 & 1/2\, q_{22}^1 T_k^2 & 0 & 0 & q_{22}^1 T_k & 0 & 0 \\ 0 & 0 & 1/2\, q_{33}^1 T_k^2 & 0 & 0 & q_{33}^1 T_k & 0 \\ 0 & 0 & 0 & 0 & 0 & 0 & q_{bias} T_k \end{pmatrix}.$$

Similarly, the covariance matrix for the system noise for the second movement mode described above may be written as:

$$Q^2(t_k, t_{k-1}) = \begin{pmatrix} 1/3\, q_{11}^1 T_k^3 & 0 & 0 & 1/2\, q_{11}^1 T_k^2 & 0 & 0 & 0 \\ 0 & 1/3\, q_{22}^2 T_k^3 & 0 & 0 & 1/2\, q_{22}^2 T_k^2 & 0 & 0 \\ 0 & 0 & 1/3\, q_{33}^2 T_k^3 & 0 & 0 & 1/2\, q_{33}^2 T_k^2 & 0 \\ 1/2\, q_{11}^2 T_k^2 & 0 & 0 & q_{11}^2 T_k & 0 & 0 & 0 \\ 0 & 1/2\, q_{22}^2 T_k^2 & 0 & 0 & q_{22}^2 T_k & 0 & 0 \\ 0 & 0 & 1/2\, q_{33}^2 T_k^2 & 0 & 0 & q_{33}^2 T_k & 0 \\ 0 & 0 & 0 & 0 & 0 & 0 & q_{bias} T_k \end{pmatrix}.$$

The covariance matrix for the measurement noise is $$R^i(t_{k+1}, t_k) = E[e(t_k)(e(t_k))^T]$$

for $1 = 1, \ldots, r$.

As described above, the measurement equation, which relates CFO measurements to the kinematic state of a UAV, may be given by $$\hat{z}^i(\hat{x}^i) = h(\hat{x}^i) = -\frac{f_c}{c} \frac{\left((\hat{x}_1^i - x_{s,1})\hat{x}_4^i + (\hat{x}_2^i - x_{s,2})\hat{x}_5^i + (\hat{x}_3^i - x_{s,3})\hat{x}_6^i\right)}{\sqrt{(\hat{x}_1^i - x_{s,1})^2 + (\hat{x}_2^i - x_{s,2})^2 + (\hat{x}_3^i - x_{s,3})^2}} + \hat{x}_7^i,$$

in which $\hat{z}^i$ is a predicted CFO assuming the UAV is in a kinematic state $\hat{x}^i$. The measurement equation may be evaluated using a predicted kinematic state of the UAV 102 (e.g. a predicted position $\hat{x}_1^i, \hat{x}_2^i, \hat{x}_3^i$ and a predicted velocity $\hat{x}_4^i, \hat{x}_5^i, \hat{x}_6^i$ if the UAV is assumed to be moving in a mode i). A predicted CFO bias may also be included (e.g. if this quantity is not determined by other means). The matrices A, Q, R are assumed to be known and may be time varying. In other words, the system may be time varying and/or the noise may be nonstationary.

The initial kinematic state x(0) of the UAV 102 may be unknown and may be modelled as a random variable that is Gaussian-distributed with a known mean and covariance. The two noise sequences, e(k) and w(k), and the initial state may be assumed to be mutually independent. This constitutes the Linear-Gaussian (LG) assumption.

This results in the following extended Kalman filter iteration, which, in an IMM process, may be performed for each of the modes $i = 1, \ldots, r$. For each mode, an initial prediction of the kinematic state of the UAV 102 may be determined based on an estimate of the kinematic state of the UAV 102 at an earlier time:

$$\hat{x}^i(t_k|t_{k-1}) = A^i(t_k, t_{k-1})\hat{x}^i(t_{k-1}|t_{k-1})\, P^i(t_k|t_{k-1}) = A^i(t_k, t_{k-1})P^i(t_{k-1}|t_{k-1})(A^i(t_k, t_{k-1}))^T + Q^i(t_k, t_{k-1}),$$

in which $A^i$ is a discrete time systems matrix and $Q^i$ is a systems noise covariance matrix. For example, in embodiments in which the two-mode model described above is used, $A^1$ and $A^2$ given above may be used as the discrete time systems matrix for the first and second movement modes respectively. A predicted CFO may be determined using the measurement equation:

$$\hat{z}^i(t_k|t_{k-1}) = h(\hat{x}^i(t_k|t_{k-1})).$$

$$H^i(\hat{x}^i(t_k|t_{k-1})) = \left.\frac{\partial h(\hat{x})}{\partial(\hat{x})}\right|_{\hat{x}=\hat{x}^i(t_k|t_{k-1})}$$

The partial derivatives may be written as:

$$\left.\frac{\partial h(\hat{x})}{\partial \hat{x}}\right|_{\hat{x}=\hat{x}^i} = \left(\frac{\partial h(\hat{x})}{\partial \hat{x}_1}\; \frac{\partial h(\hat{x})}{\partial \hat{x}_2}\; \frac{\partial h(\hat{x})}{\partial \hat{x}_3}\; \frac{\partial h(\hat{x})}{\partial \hat{x}_4}\; \frac{\partial h(\hat{x})}{\partial \hat{x}_5}\; \frac{\partial h(\hat{x})}{\partial \hat{x}_6}\; \frac{\partial h(\hat{x})}{\partial \hat{x}_7}\right)_{\hat{x}=\hat{x}^i}$$

-continued $$\left.\frac{\partial h(\hat{x})}{\partial \hat{x}_1}\right|_{\hat{x}=\hat{x}^i} = -\frac{f_c}{c} \frac{\hat{x}_4^i}{\sqrt{(\hat{x}_1^i - x_{s,1})^2 + (\hat{x}_2^i - x_{s,2})^2 + (\hat{x}_3^i - x_{s,3})^2}} + \frac{f_c}{c} \frac{(\hat{x}_1^i - x_{s,1})\left((\hat{x}_1^i - x_{s,1})\hat{x}_4^i + (\hat{x}_2^i - x_{s,2})\hat{x}_5^i + (\hat{x}_3^i - x_{s,3})\hat{x}_6^i\right)}{\left((\hat{x}_1^i - x_{s,1})^2 + (\hat{x}_2^i - x_{s,2})^2 + (\hat{x}_3^i - x_{s,3})^2\right)^{\frac{3}{2}}},$$

$$\left.\frac{\partial h(\hat{x})}{\partial \hat{x}_2}\right|_{\hat{x}=\hat{x}^i} = -\frac{f_c}{c} \frac{\hat{x}_5^i}{\sqrt{(\hat{x}_1^i - x_{s,1})^2 + (\hat{x}_2^i - x_{s,2})^2 + (\hat{x}_3^i - x_{s,3})^2}} + \frac{f_c}{c} \frac{(\hat{x}_2^i - x_{s,2})\left((\hat{x}_1^i - x_{s,1})\hat{x}_4^i + (\hat{x}_2^i - x_{s,2})\hat{x}_5^i + (\hat{x}_3^i - x_{s,3})\hat{x}_6^i\right)}{\left((\hat{x}_1^i - x_{s,1})^2 + (\hat{x}_2^i - x_{s,2})^2 + (\hat{x}_3^i - x_{s,3})^2\right)^{\frac{3}{2}}},$$

$$\left.\frac{\partial h(\hat{x})}{\partial \hat{x}_3}\right|_{\hat{x}=\hat{x}^i} = -\frac{f_c}{c} \frac{\hat{x}_6^i}{\sqrt{(\hat{x}_1^i - x_{s,1})^2 + (\hat{x}_2^i - x_{s,2})^2 + (\hat{x}_3^i - x_{s,3})^2}} - \frac{f_c}{c} \frac{(\hat{x}_3^i - x_{s,3})\left((\hat{x}_1^i - x_{s,1})\hat{x}_4^i + (\hat{x}_2^i - x_{s,2})\hat{x}_5^i + (\hat{x}_3^i - x_{s,3})\hat{x}_6^i\right)}{\left((\hat{x}_1^i - x_{s,1})^2 + (\hat{x}_2^i - x_{s,2})^2 + (\hat{x}_3^i - x_{s,3})^2\right)^{\frac{3}{2}}},$$

$$\left.\frac{\partial h(\hat{x})}{\partial \hat{x}_4}\right|_{\hat{x}=\hat{x}^i} = -\frac{f_c}{c} \frac{(\hat{x}_1^i - x_{s,1})}{\sqrt{(\hat{x}_1^i - x_{s,1})^2 + (\hat{x}_2^i - x_{s,2})^2 + (\hat{x}_3^i - x_{s,3})^2}},$$

$$\left.\frac{\partial h(\hat{x})}{\partial \hat{x}_5}\right|_{\hat{x}=\hat{x}^i} = -\frac{f_c}{c} \frac{(\hat{x}_2^i - x_{s,2})}{\sqrt{(\hat{x}_1^i - x_{s,1})^2 + (\hat{x}_2^i - x_{s,2})^2 + (\hat{x}_3^i - x_{s,3})^2}},$$

$$\left.\frac{\partial h(\hat{x})}{\partial \hat{x}_6}\right|_{\hat{x}=\hat{x}^i} = -\frac{f_c}{c} \frac{(\hat{x}_3^i - x_{s,3})}{\sqrt{(\hat{x}_1^i - x_{s,1})^2 + (\hat{x}_2^i - x_{s,2})^2 + (\hat{x}_3^i - x_{s,3})^2}},$$

$$\left.\frac{\partial h(\hat{x})}{\partial \hat{x}_7}\right|_{\hat{x}=\hat{x}^i} = 1.$$

The predicted CFO, $\hat{z}^i$, may be compared to the measured CFO, $z(t_k)$, (e.g. CFO measurements for signals sent between the UAV and the three or more base stations 104) to determine a measurement residual:

$$\varepsilon^i(t_k) = z(t_k) - \hat{z}^i(t_k|t_{k-1})$$

The partial derivatives of the measurement equation may be used to calculate the measurement covariance, $S^i$:

$$S^i(t_k) = H^i(\hat{x}^i(t_k|t_{k-1}))P^i(t_k|t_{k-1})(H^i(\hat{x}^i(t_k|t_{k-1})))^T + R^i(t_k, t_{k-1}),$$

in which $R^i$ is the measurement noise covariance matrix given above. In particular examples, measurement updates may be scalar and irregular, which means that the measurement covariance matrix may be scalar. The Kalman gain matrix, $K^i$, may be expressed as:

$$K^i(t_k) = P^i(t_k|t_{k-1})(H^i(\hat{x}^i(t_k|t_{k-1})))^T (S^i(t_k))^{-1}.$$

The predicted state at a time $t_k$ and the associated covariance, $P^i$, may be given by:

$$\hat{x}^i(t_k|t_k) = \hat{x}^i(t_k|t_{k-1}) + K^i\varepsilon^i(t_k),$$

$$P^i(t_k|t_k) = P^i(t_k|t_{k-1}) - K^i(t_k)S^i(t_k)(K^i(t_k))^T.$$

One iteration of an extended Kalman Filter may thus be used to determine a kinematic state of the UAV based on CFO measurements for three or more base stations.

As described above, a plurality of extended Kalman Filters may be used as part of an IMM filter to determine a kinematic state (e.g. a position) of a UAV 102 based on CFO measurements. In this case, the CFO measurements are input into each of the plurality of extended Kalman Filters in the IMM filter, and the outputs of the plurality of extended Kalman Filters are combined to determine the kinematic state of the UAV 102. Thus, each extended Kalman Filter may output a respective kinematic state estimate and associated covariance matrix, which are combined in the IMM filter to determine the position of the UAV 102. Each of the extended Kalman filters may be, for example, associated with a movement mode in a model comprising a plurality of movement modes. For example, an IMM filter may comprise two extended Kalman filters, in which a first extended Kalman filter corresponds to the first movement mode described above and a second extended Kalman filter corresponds to the second movement mode described above.

In alternative examples, only a single extended Kalman Filter may be used. In this case, the kinematic state (e.g. position) of the UAV 102 may be determined by inputting the CFO measurements into the single extended Kalman Filter and obtaining a kinematic state estimate for the UAV 102 from the extended Kalman Filter.

One or more extended Kalman Filters may thus be used to determine a kinematic state (e.g. a position, $x(t_k)$) of the moving UAV 102 based on CFO measurements, $z(t_k)$, of signals sent between the moving UAV 102 and three or more base stations.

In particular embodiments, CFO measurements for each of the three or more base stations 104 may be performed and/or obtained at different times. Conventionally, IMM filters may use a fixed mode transition matrix Pu, which does not take into account differences between measurement times. This may result in high rates of mode mixing in the IMM filter, which may be unphysical. In particular, this may lead to a movement mode which is adapted to steady straight line movement (e.g. the first movement mode described above with a lower acceleration noise than the second movement mode) being underutilised.

To account for differences between measurement times, the present disclosure provides an adapted IMM filtering process which comprises sampling a continuous-time mode transition model that is parametrised in terms of a time between CFO measurements. The continuous-time transition model may be re-sampled (e.g. re-discretised) each time a new CFO measurement is obtained.

For a UAV operating in one of n modes, a net increase in the probability of the UAV being in a first mode may equal a probability that has diffused to the first mode from the other n−1 modes minus the diffusion from the first mode to the other n−1 modes. Thus the diffused probability from a mode i may be the product of a mode diffusion rate parameter, $\lambda_{ij}$, a time increment $\Delta$ and a mode probability of the originating (e.g. initial) mode, $\mu_i(t)$. The probability of each of the modes may thus be given by:

$$\begin{pmatrix} \mu_1(t+\Delta) \\ \vdots \\ \mu_n(t+\Delta) \end{pmatrix} = \begin{pmatrix} \mu_1(t) \\ \vdots \\ \mu_n(t) \end{pmatrix} + \begin{pmatrix} \lambda_{11} & \cdots & \lambda_{1n} \\ \vdots & \ddots & \vdots \\ \lambda_{n1} & \cdots & \lambda_{nn} \end{pmatrix} \Delta \begin{pmatrix} \mu_1(t) \\ \vdots \\ \mu_n(t) \end{pmatrix},$$

which may be rewritten as $$\frac{1}{\Delta}\left( \begin{pmatrix} \mu_1(t+\Delta) \\ \vdots \\ \mu_n(t+\Delta) \end{pmatrix} - \begin{pmatrix} \mu_1(t) \\ \vdots \\ \mu_n(t) \end{pmatrix} \right) = \begin{pmatrix} \lambda_{11} & \cdots & \lambda_{1n} \\ \vdots & \ddots & \vdots \\ \lambda_{n1} & \cdots & \lambda_{nn} \end{pmatrix}\begin{pmatrix} \mu_1(t) \\ \vdots \\ \mu_n(t) \end{pmatrix}.$$

This may be written as an ordinary differential equation:

$$\begin{pmatrix} \dot\mu_1(t) \\ \vdots \\ \dot\mu_n(t) \end{pmatrix} = \begin{pmatrix} \lambda_{11} & \cdots & \lambda_{1n} \\ \vdots & \ddots & \vdots \\ \lambda_{n1} & \cdots & \lambda_{nn} \end{pmatrix}\begin{pmatrix} \mu_1(t) \\ \vdots \\ \mu_n(t) \end{pmatrix},$$

with solution $$\begin{pmatrix} \mu_1(\tau) \\ \vdots \\ \mu_n(\tau) \end{pmatrix} = \exp\left( \begin{pmatrix} \lambda_{11} & \cdots & \lambda_{1n} \\ \vdots & \ddots & \vdots \\ \lambda_{n1} & \cdots & \lambda_{nn} \end{pmatrix}\tau \right)\begin{pmatrix} \mu_1(0) \\ \vdots \\ \mu_n(0) \end{pmatrix},$$

which may be evaluated at time $\tau$.

For a two-mode model, such as that described above, the diffusion rate from the first mode to the second mode may be equal to the inverse of the diffusion rate from the second mode to the first mode. Under this assumption, a component-wise solution to the continuous-time mode transition probability matrix was computed using the MAPLE software package, giving:

$$D_1 = \lambda_{11} + \lambda_{22}$$

$$D_2 = \sqrt{\lambda_{11}^2 + \lambda_{22}^2 - 2\lambda_{11}\lambda_{22} + 4\lambda_{12}^2}$$

$$\left(\exp\begin{pmatrix} \lambda_{11}\tau & \lambda_{12}\tau \\ \lambda_{12}\tau & \lambda_{22}\tau \end{pmatrix}\right)_{11} =$$
$$\frac{1}{2D_2}\left(D_2\left(e^{\frac{1}{2}(D_1+D_2)\tau} + e^{\frac{1}{2}(D_1-D_2)\tau}\right) + (\lambda_{11}-\lambda_{22})\left(e^{\frac{1}{2}(D_1+D_2)\tau} - e^{\frac{1}{2}(D_1-D_2)\tau}\right)\right)$$

$$\left(\exp\begin{pmatrix} \lambda_{11}\tau & \lambda_{12}\tau \\ \lambda_{12}\tau & \lambda_{22}\tau \end{pmatrix}\right)_{12} =$$
$$\left(\exp\begin{pmatrix} \lambda_{11}\tau & \lambda_{12}\tau \\ \lambda_{12}\tau & \lambda_{22}\tau \end{pmatrix}\right)_{21} = \frac{\lambda_{12}}{D_2}\left(e^{\frac{1}{2}(D_1+D_2)\tau} - e^{\frac{1}{2}(D_1-D_2)\tau}\right)$$

$$\left(\exp\begin{pmatrix} \lambda_{11}\tau & \lambda_{12}\tau \\ \lambda_{12}\tau & \lambda_{22}\tau \end{pmatrix}\right)_{22} =$$
$$\frac{1}{2D_2}\left(D_2\left(e^{\frac{1}{2}(D_1+D_2)\tau} + e^{\frac{1}{2}(D_1-D_2)\tau}\right) + (\lambda_{22}-\lambda_{11})\left(e^{\frac{1}{2}(D_1+D_2)\tau} - e^{\frac{1}{2}(D_1-D_2)\tau}\right)\right).$$

For a stationary non-zero solution, the derivative is zero and the probabilities sum to one, which means that $$\lambda_{11} = -\lambda_{12}$$

$$\lambda_{22} = -\lambda_{21}.$$

This gives $$\exp\begin{pmatrix} \lambda_{11}\tau & -\lambda_{11}\tau \\ -\lambda_{22}\tau & \lambda_{22}\tau \end{pmatrix} = \begin{pmatrix} \dfrac{\lambda_{22} + \lambda_{11}e^{(\lambda_{11}+\lambda_{22})\tau}}{\lambda_{11}+\lambda_{22}} & -\dfrac{\lambda_{11}\left(e^{(\lambda_{11}+\lambda_{22})\tau}-1\right)}{\lambda_{11}+\lambda_{22}} \\ -\dfrac{\lambda_{22}\left(e^{(\lambda_{11}+\lambda_{22})\tau}-1\right)}{\lambda_{11}+\lambda_{22}} & \dfrac{\lambda_{11} + \lambda_{22}e^{(\lambda_{11}+\lambda_{22})\tau}}{\lambda_{11}+\lambda_{22}} \end{pmatrix}.$$

Replacing $\tau$ with $T_k = t_k - t_{k-1}$, as in the dynamic state models above, it follows that, in the IMM formalism:

$$\mu_{i|j} = \exp\left(\begin{pmatrix} \lambda_{11} & \lambda_{12} \\ \lambda_{21} & \lambda_{22} \end{pmatrix} T_k\right).$$

Therefore, in the simplified case with the additional conditions described above (e.g. for a stationary non-zero solution):

$$\mu_{i|j} = \exp\left(\begin{matrix} \lambda_{11}T_k & -\lambda_{11}T_k \\ -\lambda_{22}T_k & \lambda_{22}T_k \end{matrix}\right) =$$

$$\begin{pmatrix} \dfrac{\lambda_{22} + \lambda_{11}e^{(\lambda_{11}+\lambda_{22})T_k}}{\lambda_{11}+\lambda_{22}} & -\dfrac{\lambda_{11}\left(e^{(\lambda_{11}+\lambda_{22})T_k}-1\right)}{\lambda_{11}+\lambda_{22}} \\ -\dfrac{\lambda_{22}\left(e^{(\lambda_{11}+\lambda_{22})T_k}-1\right)}{\lambda_{11}+\lambda_{22}} & \dfrac{\lambda_{11}+\lambda_{22}e^{(\lambda_{11}+\lambda_{22})T_k}}{\lambda_{11}+\lambda_{22}} \end{pmatrix}.$$

Thus, given a sampling period $T_k$, a time varying discrete time transition probability matrix can be computed, which makes mode mixing invariant with respect to the measurement time instances. By sampling this continuous-time mode transition model, embodiments described herein enable CFO measurements for three or more base stations that were performed at different times to be used to determine a kinematic state (e.g. position) of a moving UAV.

The present disclosure thus provides methods by which the position of a moving UAV may be determined using CFO measurements for three or more base stations. The CFO measurements may be, for example, input to one or more extended Kalman filters to determine the UAV's position. In particular embodiments, the movement of the UAV is modelled using two movement modes in which the UAV has a non-zero velocity. One of the movement modes has a higher acceleration noise than the other, and thus may be referred to as a manoeuvre mode. A continuous-time mode transition model may be sampled as part of the IMM process to enable CFO measurements performed at different times to be used when determining the UAVs position.

The skilled person will appreciate that, conventionally, CFO measurements alone are not considered to be sufficient to determine position. For example, a single CFO measurement is usually considered insufficient to deduce one dimensional position information. In order to illustrate that CFO measurements can be used to determine a position of a moving UAV, an observability study was performed, with the results illustrated in FIGS. 4a-4g.

A linear system of order n (e.g. with n state variables), characterised by $$\dot{x} = Ax$$

$$y = Hx,$$

in which x is a property of the system that is not being directly measured (e.g. a position of the UAV) and y is a measurable quantity (e.g. CFO, z), is observable provided the row rank of the observability matrix is equal to n. The observability matrix, $\mathcal{O}$, of such a linear system may be given by $$\mathcal{O} = \begin{pmatrix} H \\ HA \\ \vdots \\ HA^{n-1} \end{pmatrix}.$$

Thus, a linear system is observable if $$\operatorname{rank}(\mathcal{O}) = \operatorname{rank}\begin{pmatrix} H \\ HA \\ \vdots \\ HA^{n-1} \end{pmatrix} = n.$$

That is, if the observability matrix has n linearly independent rows, then the property x may be determined using the measurable quantity y (e.g. the system is observable). The observability of a system may also be determined by considering the minimum singular values of the observability matrix. The rank of a matrix equals the number of non-zero singular values of the matrix. As an n×n matrix has n singular values, if the minimum singular value of a square matrix is equal to zero, then rank($\mathcal{O}$)<n, and the system may not be observable. In general, the higher and more equally distributed the singular values of the observability matrix are, the better conditioned the associated estimation problem.

The observability of the methods of the present disclosure were evaluated by using this linear state equation, together with the linearised measurement equations for the CFO, z, provided above. Scenarios with varying numbers of sites were considered, using the following base station positions:

$S_1 = (200\ 100\ 5)'m,$ $S_2 = (100\ 40\ 110)'m,$ $S_3 = (800\ -50\ 70)'m,$ $S_4 = (500\ -100\ 50)'m,$ $S_5 = (50\ 200\ 180)'m,$ $S_6 = (0\ 245\ 60)'m,$ $S_7 = (-50\ 0\ 75)'m.$

Figure 4A:
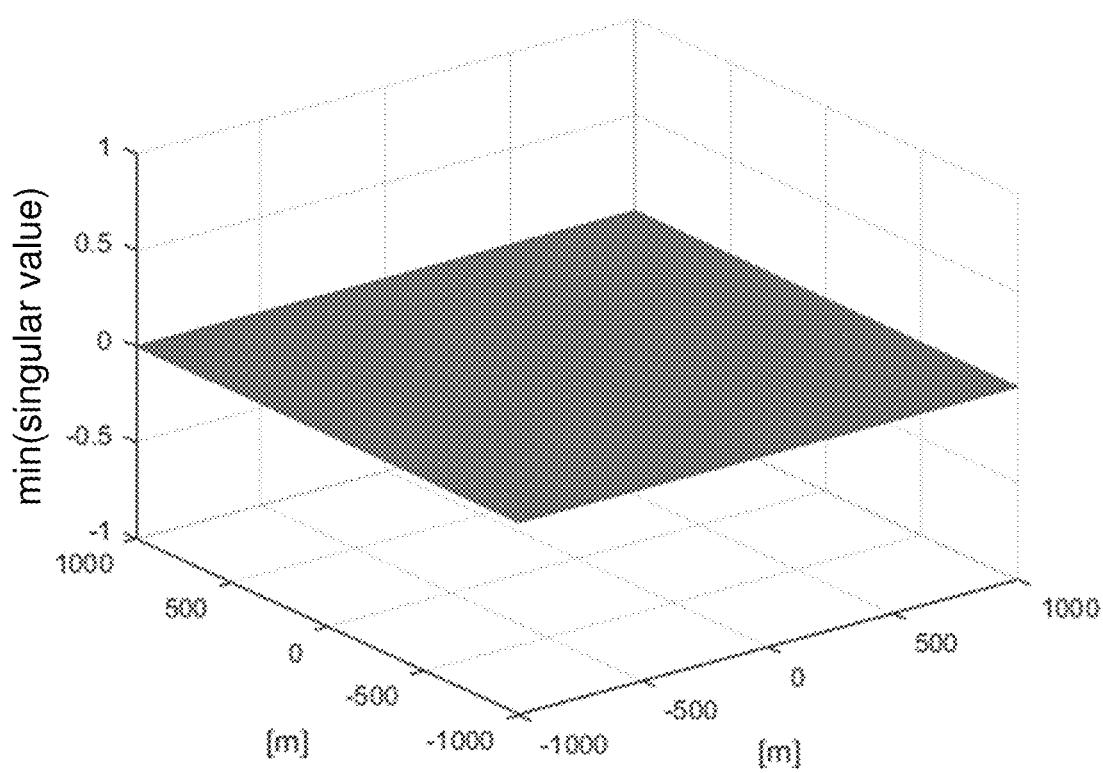
FIGS. 4*a*-4*g* show maps of minimum singular values of an observability matrix for a method of determining a position of a moving UAV using measurements for varying numbers of base stations.
Figure 4B:
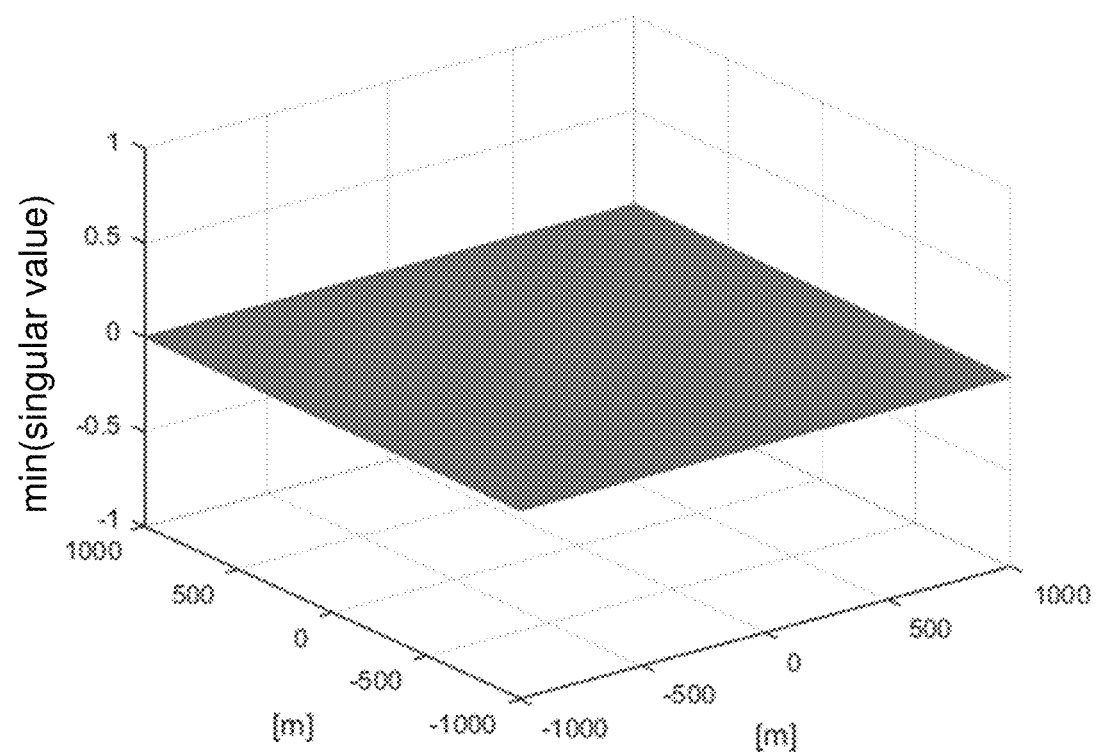
Figure 4C:
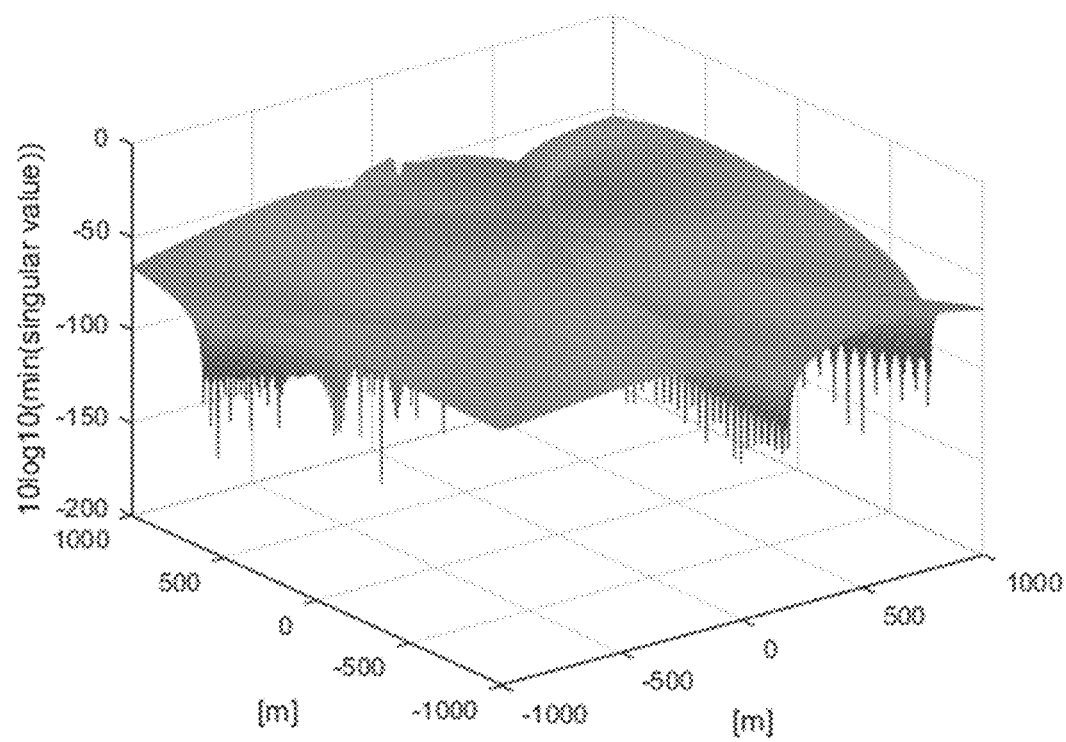
Figure 4D:
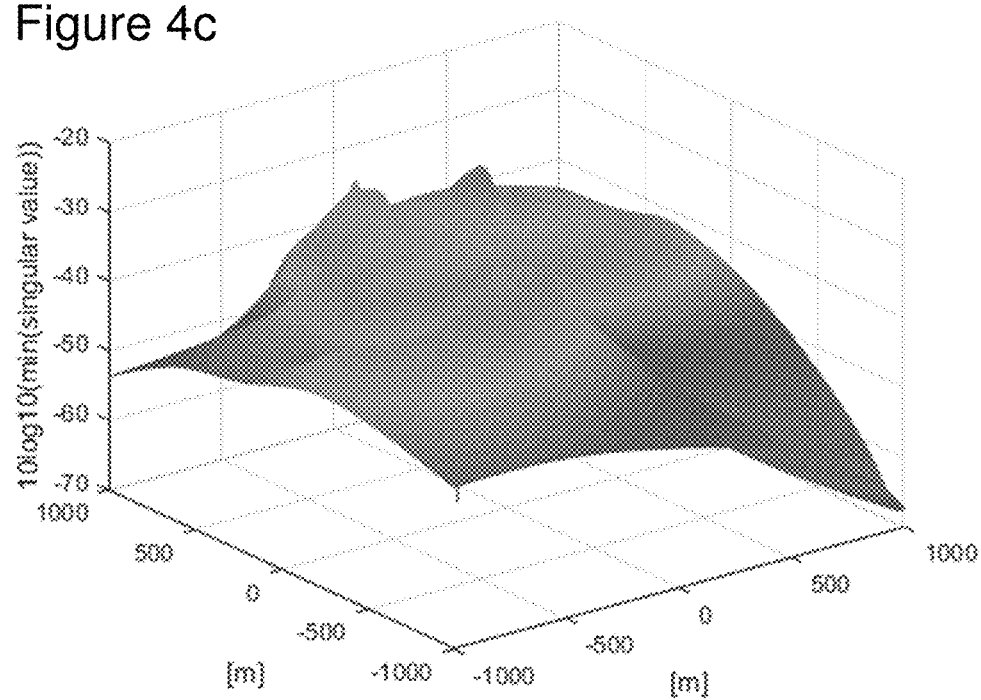
Figure 4E:
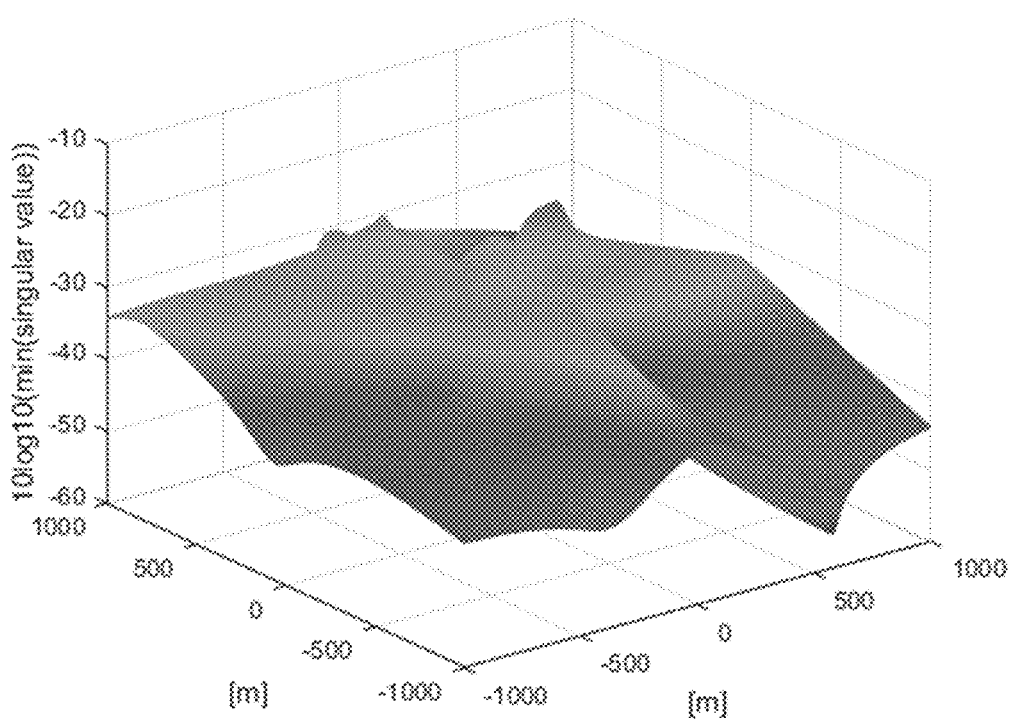
Figure 4F:
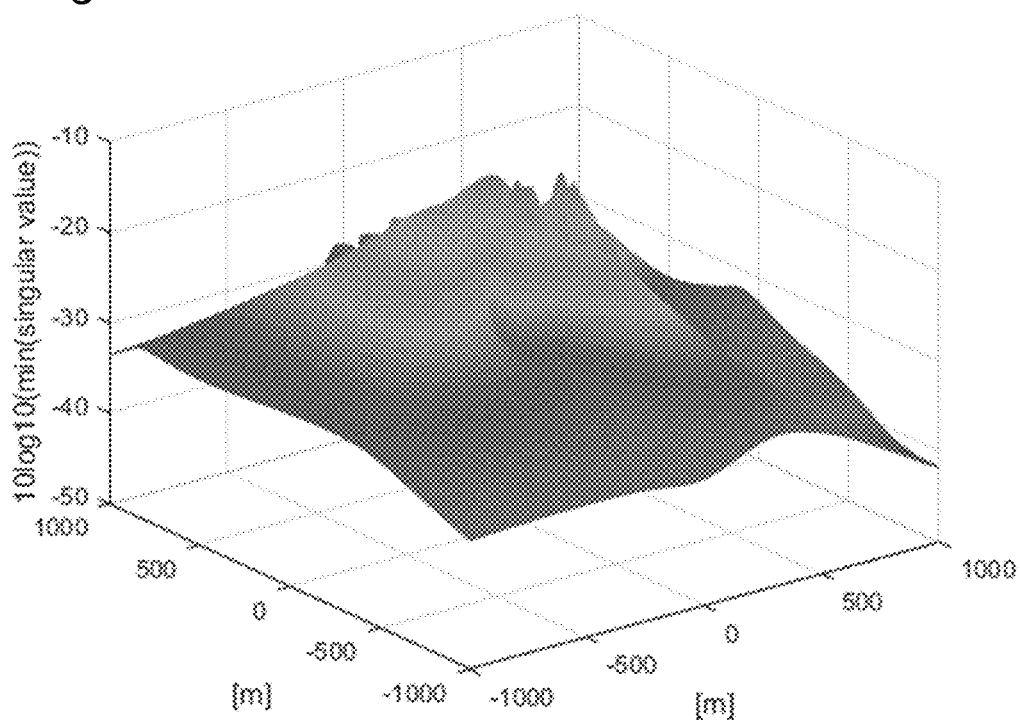
Figure 4G:
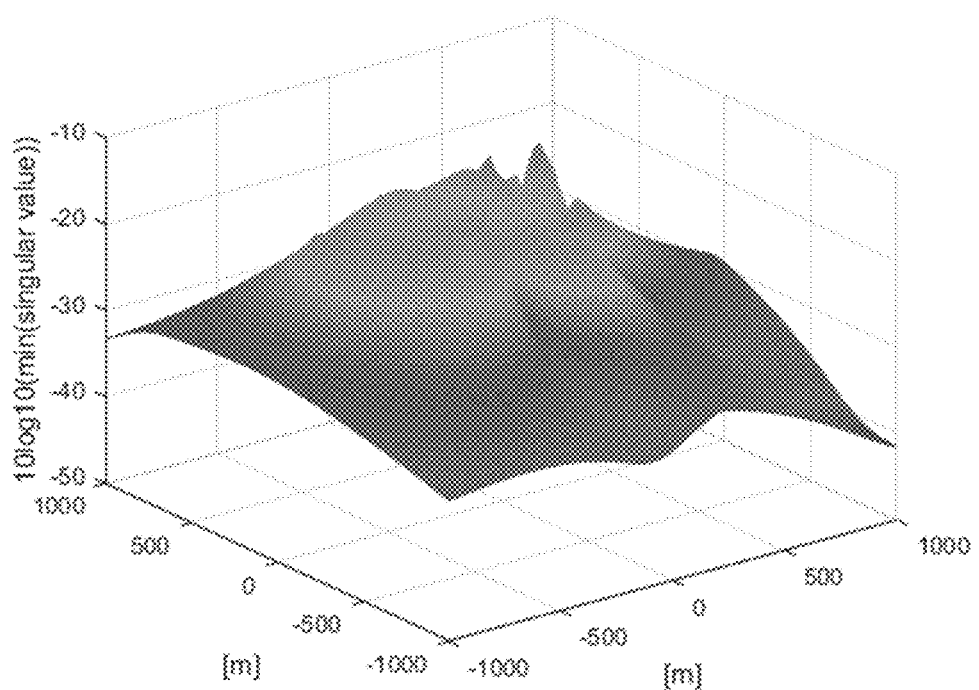

FIGS. 4a-4g show the minimum singular value of the observability matrix when using methods according to embodiments of the disclosure with increasing numbers of base stations from 1 (FIGS. 4a) to 7 (FIG. 4g). In these examples, the observability matrix was calculated assuming that CFO measurements were to be used to determine both a position and a velocity of a moving UAV. Thus, FIGS. 4a-4g illustrate whether or not it is possible to determine a position and a velocity of a moving UAV using only CFO measurements, in particular therefore also addressing the possibility to estimate position from CFO measurements. In each case, a fixed CFO bias was assumed.

It is apparent from FIGS. 4a and 4b, which use one and two base stations respectively, that the system is not observable if fewer than three base stations are used. However, FIGS. 4c-4g show that the minimum singular value is non-zero if CFO measurements for three or more base stations are used. It is therefore possible to determine a position (and velocity) of a moving UAV using only CFO measurements for signals sent between the moving UAV and three or more base stations.

However, the skilled person will appreciate from FIG. 4c that there are singular curves for which the observability requirements are not met, which means that there are trajectories for which it may not be possible to determine the position and velocity of the moving UAV with a desired level of accuracy. Thus, it may be preferable to obtain and use CFO measurements for four or more base stations. This may be particularly relevant in embodiments in which the CFO bias is also determined based on the CFO measurements. In general, increasing the number of base stations increases the observability of the system. Moreover, the observability of the system increases as the distance between the UAV and the respective base stations decreases, which reflects the geometric properties of the estimation problem at hand.

In embodiments in which CFO measurements are input to a model to determine a position of a moving UAV and a CFO bias in the CFO measurements, using CFO measurements for five or more base stations may yield more accurate position estimates.

The observability analysis thus indicates that CFO measurements alone are sufficient to determine a position of a moving UAV, provided measurements for three or more base stations are used. This may be further illustrated by considering the measurement equation for CFO measurements:

$$h(\hat{x}^i) = -\frac{f_c}{c} \frac{\left((\hat{x}_1^i - x_{s,1})\hat{x}_4^i + (\hat{x}_2^i - x_{s,2})\hat{x}_5^i + (\hat{x}_3^i - x_{s,3})\hat{x}_6^i\right)}{\sqrt{(\hat{x}_1^i - x_{s,1})^2 + (\hat{x}_2^i - x_{s,2})^2 + (\hat{x}_3^i - x_{s,3})^2}},$$

in which $\hat{x}_4$, $\hat{x}_5$, $\hat{x}_6$ are the components of the relative velocity of a moving UAV and $\hat{x}_1$, $\hat{x}_2$, $\hat{x}_3$ are the position coordinates of the moving UAV. In a system comprising three base stations, a respective Doppler frequency, $\underline{f_D}$, is measurable for each of the three base stations:

$$f_{D,1} = -\frac{f_c}{c} \frac{\left((\hat{x}_1^i - x_{1,1})\hat{x}_4^i + (\hat{x}_2^i - x_{1,2})\hat{x}_5^i + (\hat{x}_3^i - x_{1,3})\hat{x}_6^i\right)}{\sqrt{(\hat{x}_1^i - x_{1,1})^2 + (\hat{x}_2^i - x_{1,2})^2 + (\hat{x}_3^i - x_{1,3})^2}}$$

$$f_{D,2} = -\frac{f_c}{c} \frac{\left((\hat{x}_1^i - x_{2,1})\hat{x}_4^i + (\hat{x}_2^i - x_{2,2})\hat{x}_5^i + (\hat{x}_3^i - x_{2,3})\hat{x}_6^i\right)}{\sqrt{(\hat{x}_1^i - x_{2,1})^2 + (\hat{x}_2^i - x_{2,2})^2 + (\hat{x}_3^i - x_{2,3})^2}}$$

$$f_{D,3} = -\frac{f_c}{c} \frac{\left((\hat{x}_1^i - x_{3,1})\hat{x}_4^i + (\hat{x}_2^i - x_{3,2})\hat{x}_5^i + (\hat{x}_3^i - x_{3,3})\hat{x}_6^i\right)}{\sqrt{(\hat{x}_1^i - x_{3,1})^2 + (\hat{x}_2^i - x_{3,2})^2 + (\hat{x}_3^i - x_{3,3})^2}}.$$

As the CFO measurements (which are indicative of a difference between the measured frequency and the transmitted carrier frequency) may be used to constrain the velocity of the moving UAV directly and the respective positions of the base stations are assumed to be known, the only remaining unknowns in the aforementioned equations are the three position components for the moving UAV. Thus, there are three nonlinear equations with three unknowns, which means there may be a finite number of solutions or even a unique solution.

For the purpose of illustrating the operation and performance of embodiments of the present disclosure, the performance of a position estimator operating according to examples disclosed herein has been simulated.

FIGS. 5-9 relate to a first simulation of a moving UAV according to embodiments of the disclosure. The parameters of the simulation are given in Table 1. Each base station used an average sampling period of 2.0 s and a Doppler shift standard deviation of 6.0 Hz. The trajectory of the simulated moving UAV was generated using numerical integration with an integration time (e.g. time step) of 0.1 seconds. In order to obtain asynchronous CFO measurements, each base station is assigned a sampling period having an average component and a random component. In this first simulation, the CFO bias is set to 70 Hz and the base stations using an average sampling period of 2.0 s. The simulated CFO measurements for each base station were obtained by interpolating a kinematic state (e.g. position and velocity) of the UAV to the measurement time of the base station, and then applying the nonlinear measurement equation (as described above), subject to additional random noise. CFO measurements from five base stations were used, with the positions of the base stations illustrated in FIG. 5 by asterisks.

TABLE 1

| Parameter | Description | Value |
|---|---|---|
| $\sqrt{q_{11}^1}$ | Low bandwidth constant velocity mode acceleration systems noise. | 4.0 m/s² |
| $\sqrt{q_{22}^1}$ | Low bandwidth constant velocity mode acceleration systems noise. | 4.0 m/s² |
| $\sqrt{q_{33}^1}$ | Low bandwidth constant velocity mode acceleration systems noise. | 4.0 m/s² |
| $\sqrt{q_{11}^2}$ | High bandwidth constant velocity mode acceleration systems noise. | 25.0 m/s² |
| $\sqrt{q_{22}^2}$ | High bandwidth constant velocity mode acceleration systems noise. | 25.0 m/s² |
| $\sqrt{q_{33}^2}$ | High bandwidth constant velocity mode acceleration systems noise. | 25.0 m/s² |
| $\sqrt{q_{bias}}$ | UE Doppler drift rate systems noise. | 1/180 Hz/s |
| $\lambda_{11}$ | The mode switch rate 1→1 | −0.20 s⁻¹ |
| $\lambda_{22}$ | The mode switch rate 2→2 | −0.10 s⁻¹ |

Figure 5:
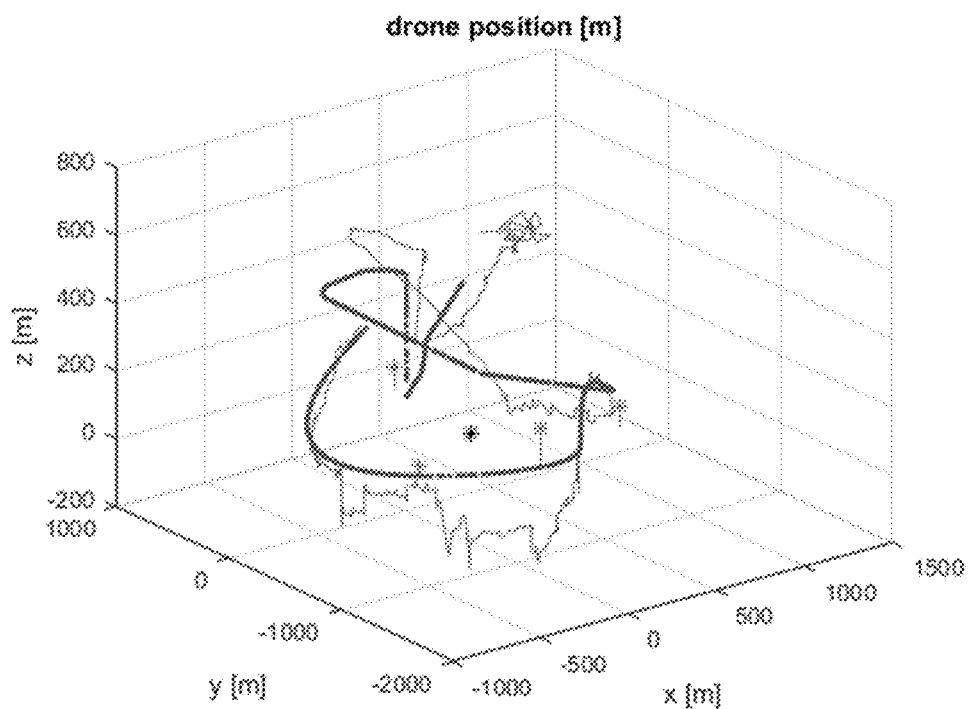
FIGS. 5 and 10 show simulated trajectories and estimated trajectories of a moving UAV in first and second simulations respectively according to embodiments of the disclosure.
Figure 6:
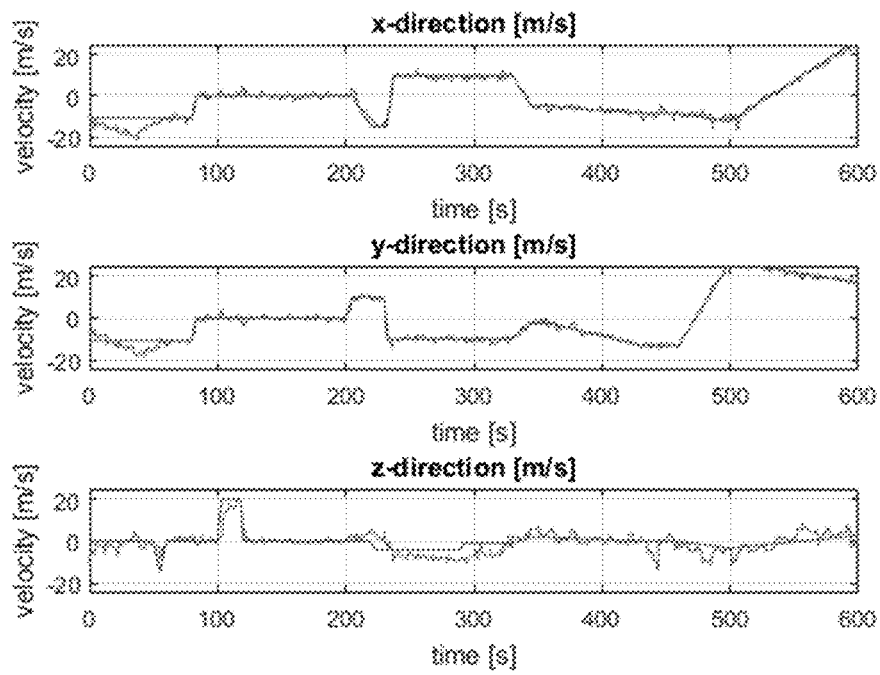
FIGS. 6 and 11 show velocities and estimated velocities of a moving UAV in first and second simulations respectively according to embodiments of the disclosure.
Figure 7:
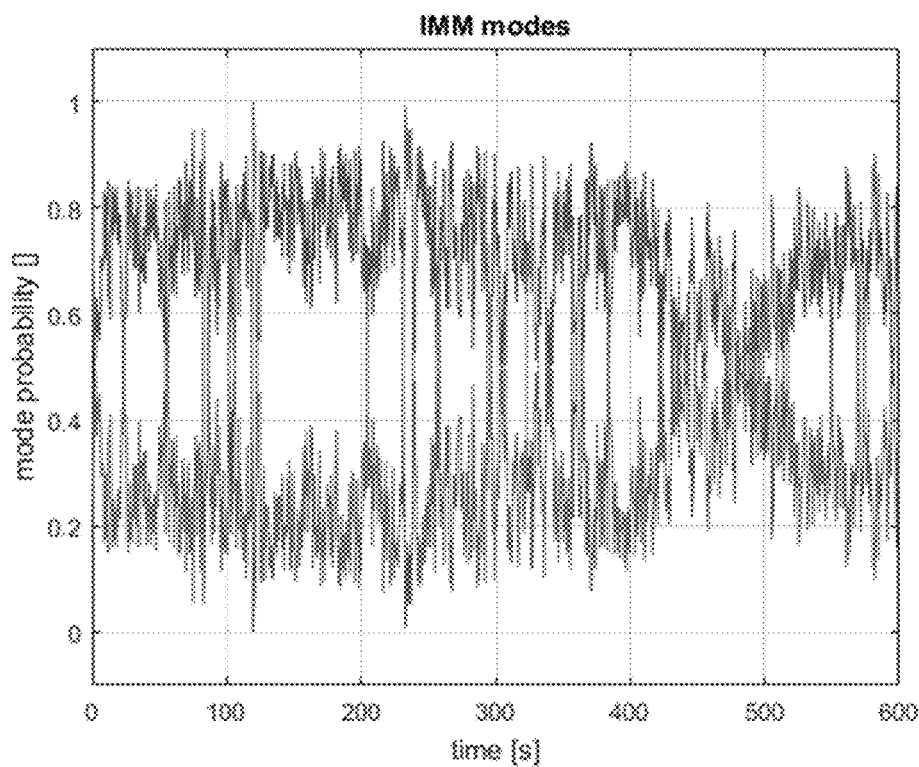
FIGS. 7 and 12 show probabilities of a moving UAV being in first and second movement modes in first and second simulations respectively according to embodiments of the disclosure.

FIG. 5 shows a measured trajectory and an estimated trajectory for the first simulation of a moving UAV according to embodiments of the disclosure. The corresponding measured velocity and estimated velocity in the x, y and z directions are shown in FIG. 6. FIG. 7 shows a variation in a mode probability for a first movement mode and a second movement mode, as described above (e.g. two movement modes with a non-zero velocity and an acceleration noise, in which the acceleration noise for one of the modes is larger than the acceleration noise for the other mode). More specifically, the (mostly) lower curve shows the mode probability for the second movement mode (the manoeuvre mode), which has a higher acceleration noise than the first movement mode (shown by the higher curve).

Figure 8:
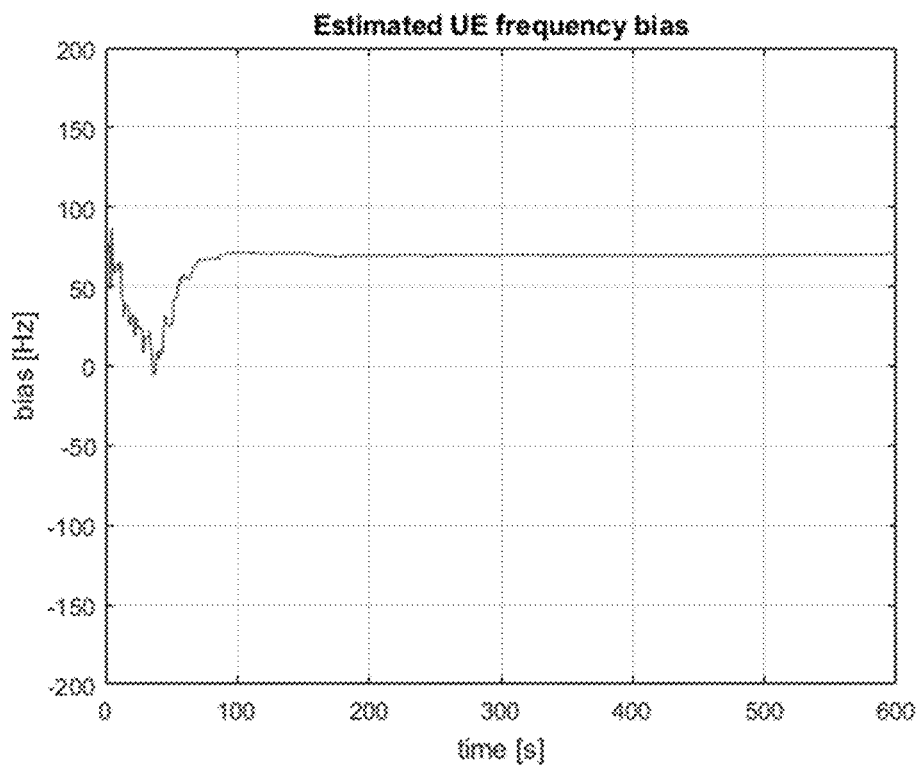
FIGS. 8 and 13 show estimates of carrier frequency offset bias in first and second simulations respectively according to embodiments of the disclosure.
Figure 9:
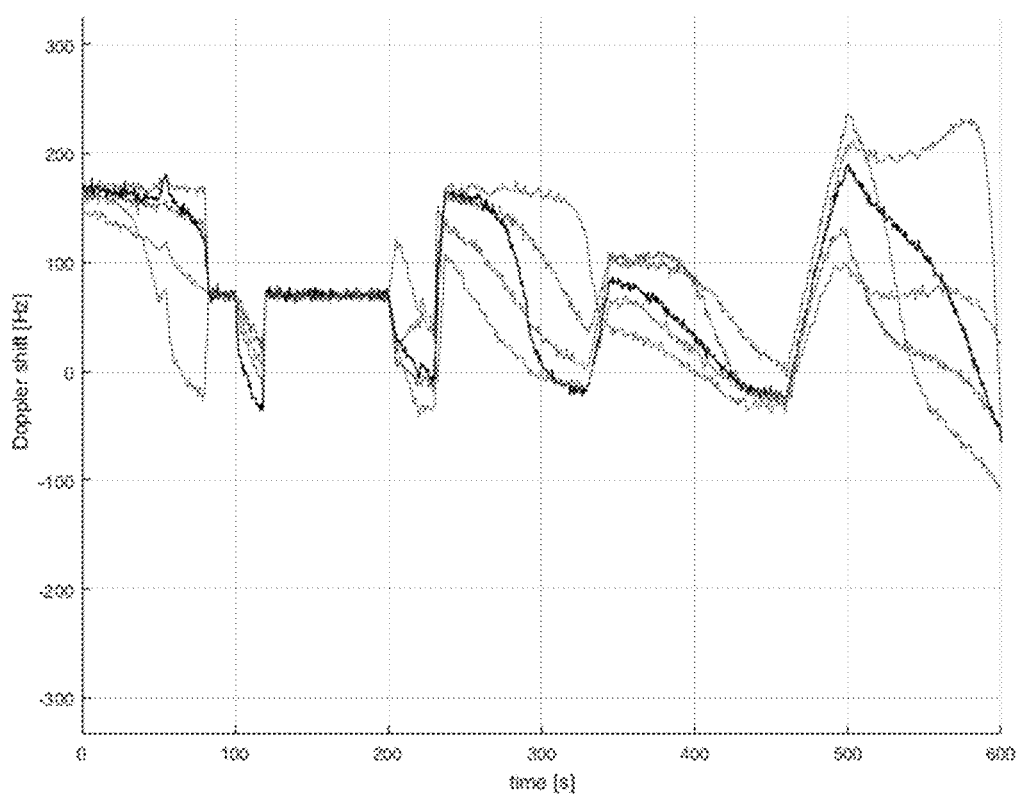
FIG. 9 shows carrier frequency offset measurements in a first simulation according to embodiments of the disclosure.

The variation in the CFO bias determined using methods described herein is shown in FIG. 8. FIG. 9 shows the CFO measurements (labelled as Doppler shift) for the five base stations, in which each line shows CFO measurements for a respective base station in the five base stations.

FIGS. 5 and 6 in particular demonstrate that the trajectory (e.g. the variation in position and velocity) of a moving UAV may be monitored using only CFO measurements performed on signals sent between the moving UAV and five or more base stations. As described above, the methods described herein may be used more generally for systems comprising three or more base stations.

FIGS. 10-13 relate to a second simulation of a moving UAV according to embodiments of the disclosure. The parameters of the simulation are given in Table 1 above. Six base stations are used, with the position of the base stations indicated in FIG. 10 by asterisks. Each base station used an average sampling period of 0.5 s and a Doppler shift standard deviation of 4.0 Hz.

Figure 10:
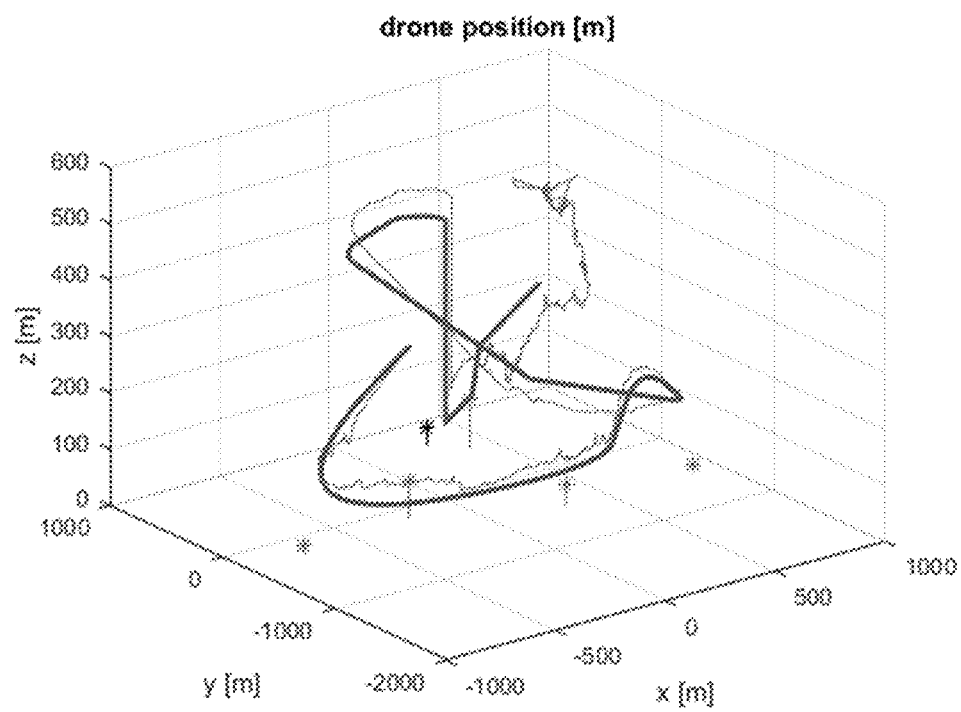
Figure 11:
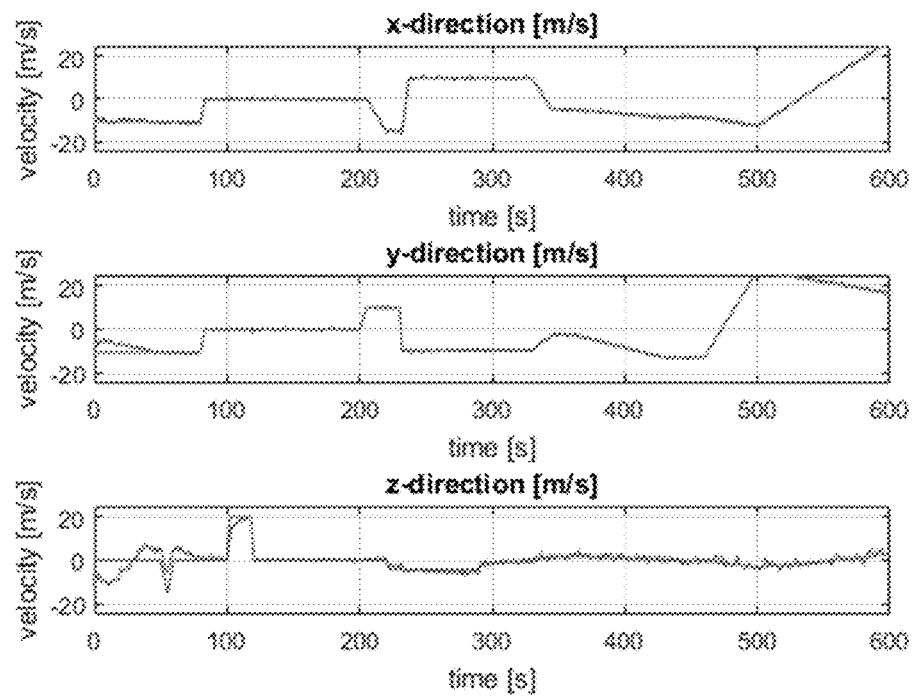
Figure 12:
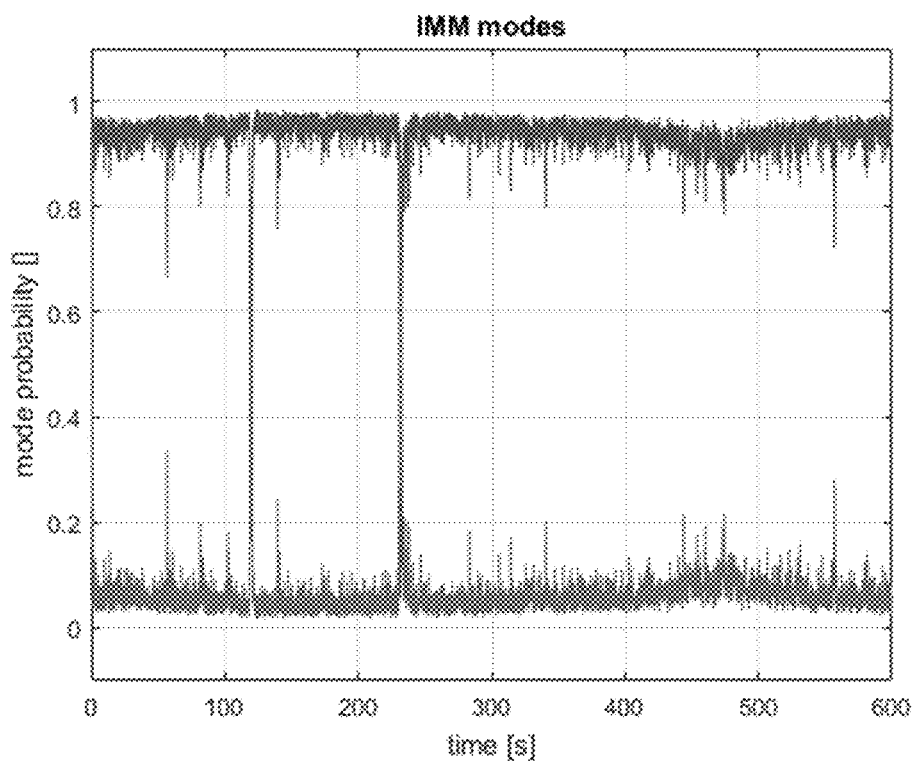

FIG. 10 shows a measured trajectory and an estimated trajectory for the second simulation of a moving UAV according to embodiments of the disclosure. The corresponding measured velocity and estimated velocity in the x, y and z directions are shown in FIG. 11. FIG. 12 shows a variation in a mode probability for a first movement mode and a second movement mode, as described above (e.g. two movement modes with a non-zero velocity and an acceleration noise, in which the acceleration noise for one of the modes is larger than the acceleration noise for the other mode). As in FIG. 7, the (mostly) lower curve shows the mode probability for the second movement mode (the manoeuvre mode), which has a higher acceleration noise than the first movement mode.

Figure 13:
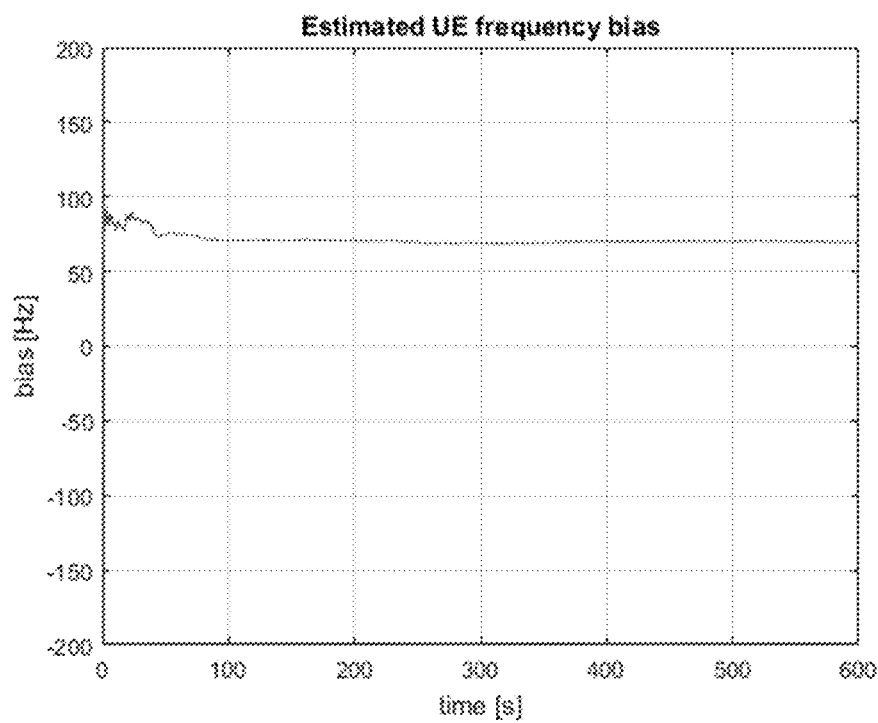

The variation in the CFO bias for the second simulation, as determined using methods described herein, is shown in FIG. 13.

FIGS. 10 and 11, in particular, demonstrate that the position and velocity of a moving UAV may be determined using CFO measurements for six base stations, even in the absence of any range measurements.

Embodiments of the present disclosure thus provide methods for determining a kinematic state (e.g. a position) of a moving UAV using CFO measurements for the UAV with respect to three or more base stations.

Figure 14:
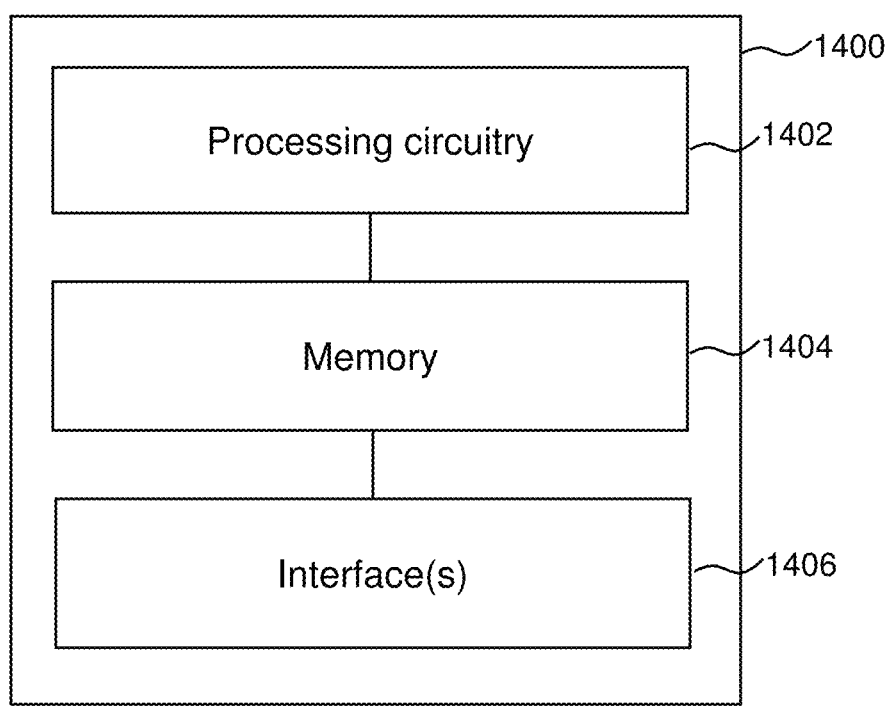
FIGS. 14 and 15 are schematic diagrams of apparatuses according to embodiments of the disclosure.

FIG. 14 is a schematic diagram of an apparatus 1400 for determining the position of a moving UAV according to embodiments of the disclosure. The apparatus 1400 may be, for example, a base station (such as any of the base stations 104a, 104b, 104c described above in respect of FIG. 1) or a node in a core network of a communications network or connected to such a core network. For example, the apparatus 1400 may be the position estimator 106 described above in respect of FIG. 1.

The apparatus 1400 may be operable to carry out the example method described with reference to FIG. 2 and possibly any other processes or methods disclosed herein. It is also to be understood that the method of FIG. 2 may not necessarily be carried out solely by the apparatus 1400. At least some operations of the method can be performed by one or more other entities.

The apparatus 1400 comprises processing circuitry 1402 (such as one or more processors, digital signal processors, general purpose processing units, etc), a machine-readable medium 1404 (e.g., memory such as read-only memory (ROM), random-access memory, cache memory, flash memory devices, optical storage devices, etc) and one or more interfaces 1406.

In one embodiment, the machine-readable medium 1404 stores instructions which, when executed by the processing circuitry 1402, cause the apparatus 1400 to: obtain, for each of three or more base stations, one or more measurements of a CFO for one or more signals sent between the moving UAV and the respective base station. The apparatus 1400 is further caused to input the CFO measurements into a model to determine a position of the UAV. Inputs to the model do not include range measurements of the UAV with respect to the three or more base stations.

In other embodiments, the processing circuitry 1402 may be configured to directly perform the method, or to cause the apparatus 1400 to perform the method, without executing instructions stored in the non-transitory machine-readable medium 1404, e.g., through suitably configured dedicated circuitry.

The one or more interfaces 1406 may comprise hardware and/or software suitable for communicating with other nodes of the communication network using any suitable communication medium. For example, the interfaces 1406 may comprise one or more wired interfaces, using optical or electrical transmission media. Such interfaces may therefore utilize optical or electrical transmitters and receivers, as well as the necessary software to encode and decode signals transmitted via the interface. In a further example, the interfaces 1406 may comprise one or more wireless interfaces. Such interfaces may therefore utilize one or more antennas, baseband circuitry, etc. The components are illustrated coupled together in series; however, those skilled in the art will appreciate that the components may be coupled together in any suitable manner (e.g., via a system bus or suchlike).

In further embodiments of the disclosure, the apparatus 1400 may comprise power circuitry (not illustrated). The power circuitry may comprise, or be coupled to, power management circuitry and is configured to supply the components of apparatus 1400 with power for performing the functionality described herein. Power circuitry may receive power from a power source. The power source and/or power circuitry may be configured to provide power to the various components of apparatus 1400 in a form suitable for the respective components (e.g., at a voltage and current level needed for each respective component). The power source may either be included in, or external to, the power circuitry and/or the apparatus 1400. For example, the apparatus 1400 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 15:
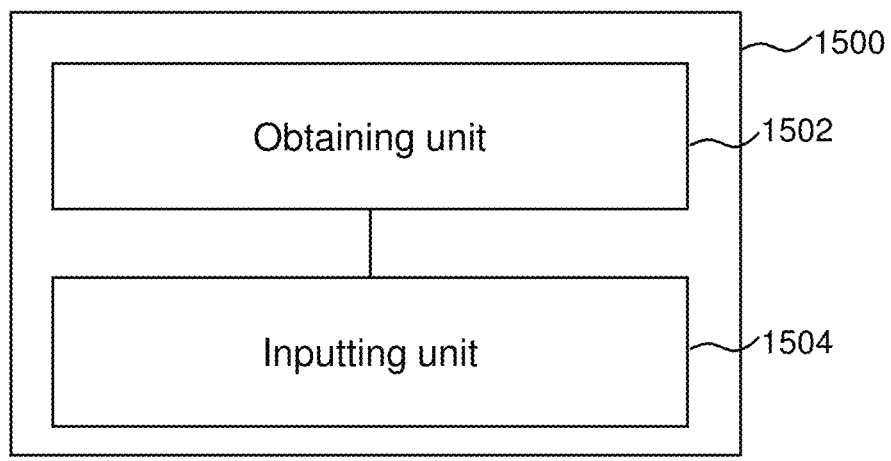

FIG. 15 is a schematic diagram of an apparatus 1500 for determining a position of a moving UAV according to embodiments of the disclosure. The apparatus 1500 may be, for example, a base station (such as any of the base stations 104a, 104b, 104c described above in respect of FIG. 1) or a node in a core network of a communications network or connected to such a core network. For example, the apparatus 1500 may be the position estimator 106 described above in respect of FIG. 1.

The apparatus 1500 comprises an obtaining unit 1502, which is configured to obtain, for each of three or more base stations, one or more measurements of a CFO for one or more signals sent between the moving UAV and the respective base station. The apparatus 1500 further comprises an inputting unit 1504, which is configured to input the CFO measurements into a model to determine a position of the UAV, wherein inputs to the model do not include range measurements of the UAV with respect to the three or more base stations. Thus, for example, the obtaining unit 1402 and the inputting unit 1404 may be configured to perform steps 202 and 204 (described above in respect of FIG. 2) respectively.

The apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining unit 1502 and inputting unit 1504, and any other suitable units of apparatus 1500 to perform corresponding functions according one or more embodiments of the present disclosure.

The apparatus 1500 may additionally comprise power-supply circuitry (not illustrated) configured to supply the apparatus 1500 with power.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of determining a position of a moving unmanned aerial vehicle, UAV, the method comprising:
    obtaining, for each of three or more base stations, one or more measurements of a carrier frequency offset, CFO, for one or more signals sent between the moving UAV and the respective base station;
    inputting the CFO measurements into a plurality of extended Kalman filters, wherein inputs to the plurality of extended Kalman filters do not include range measurements of the UAV with respect to the three or more base stations; and
    combining one or more outputs of the plurality of extended Kalman filters to determine a position of the UAV using an interacting-multiple-model, IMM, filtering process.

2. The method of claim 1, wherein the CFO measurements are the only measurements that are input to the plurality of extended Kalman filters that are indicative of a position of the UAV.

3. The method of claim 1, wherein the UAV is modelled as being in one of a plurality of movement modes, each of the plurality of movement modes being associated with a respective extended Kalman filter in the plurality of extended Kalman filters.

4. The method of claim 3, wherein the plurality of movement modes comprises a first state model driven by a first Wiener process and a second state model driven by a second Wiener process, in which the second Wiener process represents a larger acceleration noise than the first Wiener process.

5. The method of claim 4, wherein each state model comprises a CFO bias state, representing at least a UAV clock offset indicating a difference in sampling frequency between the UAV and the three or more base stations.

6. The method of claim 5, wherein the three or more base stations comprise four or more base stations and inputting the CFO measurements into the plurality of extended Kalman filters to determine a position of the UAV comprises inputting the CFO measurements into a model to determine a position of the UAV and the CFO bias.

7. The method of claim 3, wherein at least two of the CFO measurements are performed at different times and wherein combining one or more outputs of the plurality of extended Kalman filters using an IMM filtering process comprises sampling a continuous-time mode transition model that is parametrized in terms of a time between CFO measurements.

8. The method of claim 1, wherein each of the CFO measurements comprises an average of a plurality CFO measurements performed on signals sent between the moving UAV and the respective base station in a plurality of subframes.

9. The method of claim 8, wherein the plurality of CFO measurements are averaged using a one-tap Infinite Impulse Response filter.

10. The method of claim 1, wherein at least one of the three or more base stations comprise a serving base station, wherein the one or more signals are sent to and received by the serving base station from the UAV, and wherein base stations other than the serving base station eavesdrop on the one or more signals.

11. The method of claim 1, further comprising performing said method for the UAV at each of a plurality of time instances to monitor a trajectory of the UAV.

12. The method of claim 1, wherein the method is performed by a serving base station for the UAV.

13. An apparatus for determining a position of a moving unmanned aerial vehicle, UAV, the apparatus comprising processing circuitry and a non-transitory machine-readable medium storing instructions which, when executed by the processing circuitry, cause the apparatus to:
    obtain, for each of three or more base stations, one or more measurements of a carrier frequency offset, CFO, for one or more signals sent between the moving UAV and the respective base station;
    input the CFO measurements into a plurality of extended Kalman filters, wherein inputs to the plurality of extended Kalman filters do not include range measurements of the UAV with respect to the three or more base stations; and
    combining one or more outputs of the plurality of extended Kalman filters to determine a position of the UAV using an interacting-multiple-model, IMM, filtering process.

14. The apparatus of claim 13, wherein the CFO measurements are the only measurements that are input to the plurality of extended Kalman filters that are indicative of a position of the UAV.

15. The apparatus of claim 13, wherein the UAV is modelled as being in one of a plurality of movement modes, each of the plurality of movement modes being associated with a respective extended Kalman filter in the plurality of extended Kalman filters.

16. The apparatus of claim 15, wherein the plurality of movement modes comprises a first state model driven by a first Wiener process and a second state model driven by a second Wiener process, in which the second Wiener process represents a larger acceleration noise than the first Wiener process.

17. The apparatus of claim 16, wherein each state model comprises a CFO bias caused by a UAV clock offset indicating a difference in sampling frequency between the UAV and the three or more base stations.

18. The apparatus of claim 17, wherein the three or more base stations comprise four or more base stations and inputting the CFO measurements into the plurality of extended Kalman filters to determine a position of the UAV comprises inputting the CFO measurements into a model to determine a position of the UAV and the CFO bias.

19. A method of determining a position of a moving unmanned aerial vehicle, UAV, the method comprising:

obtaining, for each of three or more base stations, one or more measurements of a carrier frequency offset, CFO, for one or more signals sent between the moving UAV and the respective base station; and inputting the CFO measurements into a model to determine a position of the UAV, wherein inputs to the model do not include range measurements of the UAV with respect to the three or more base stations, wherein each of the CFO measurements comprises an average of a plurality CFO measurements performed on signals sent between the moving UAV and the respective base station in a plurality of subframes.

20. The method of claim 19, wherein the plurality of CFO measurements are averaged using a one-tap Infinite Impulse Response filter.

* * * * *